(12) United States Patent
Livne et al.

(10) Patent No.: US 9,973,356 B1
(45) Date of Patent: May 15, 2018

(54) SLICER AND DECISION FEEDBACK EQUALIZATION CIRCUITRY

(71) Applicant: Intel Corporation, Santa Clara, CA (US)

(72) Inventors: Ram Livne, Jerusalem (IL); Ro'ee Eitan, Jerusalem (IL); Yoel Krupnik, Jerusalem (IL); Vladislav Tsirkin, Jerusalem (IL); Tomer Fael, Jerusalem (IL); Dror Lazar, Kiryat Bialik (IL); Ariel Cohen, Modiin-Makkabbim-Reut (IL); Alexander Pogrebinsky, Yokneam Elit (IL); Adee Ofir Ran, Maayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/475,690

(22) Filed: Mar. 31, 2017

(51) Int. Cl.
| H03L 7/08 | (2006.01) |
| H04L 25/03 | (2006.01) |
| H03G 3/20 | (2006.01) |
| H04L 25/06 | (2006.01) |

(52) U.S. Cl.
CPC ......... *H04L 25/03057* (2013.01); *H03G 3/20* (2013.01); *H03L 7/0807* (2013.01); *H04L 25/06* (2013.01)

(58) Field of Classification Search
CPC ..... H04L 25/03057; H04L 25/06; H03L 7/08; H03G 3/20
See application file for complete search history.

(56) References Cited

U.S. PATENT DOCUMENTS

| 2013/0214865 | A1* | 8/2013 | Bulzacchelli | ......... H03F 1/0261 330/261 |
| 2015/0312060 | A1* | 10/2015 | Sinha | ................ H04L 25/03057 375/233 |
| 2016/0359645 | A1* | 12/2016 | Mukherjee | ........ H04L 25/03057 |

OTHER PUBLICATIONS

Kimura, H., et.al., Ultra-High-Speed Transceivers and Techniques, 2.1., 28Gb/s 560mW Multi-Standard SerDes with Single-Stage Analgo Front-End and 14 tap Decision-Feedback Equalizer in 28nm CMOS, 2014 IEEE International Solid-State Circuits Conference, Feb. 10, 2014, pp. 1-3, LSI, San Jose, CA, USA.

Gangasani, G.R., et.al., A 16-Gb/s Backplane Transceiver with 12-Tap Current Integrating DFE and Dynamic Adaptation of Voltage Offset and Timing Drifts in 45-nm SOI CMOS Technology, IEEE Journal of Solid-State Circuits, Jul.,19, 2012, vol. 47, Issue: 8, IEEE, Piscataway, NJ, USA, 4 pages.

(Continued)

*Primary Examiner* — Jaison Joseph
(74) *Attorney, Agent, or Firm* — Grossman, Tucker, Perreault & Pfleger, PLLC

(57) ABSTRACT

One embodiment provides an enhanced slicer. The enhanced slicer includes a first clocked comparator circuitry and a current path circuitry. The first clocked comparator circuitry includes a first comparator circuitry, a first latch circuitry, a first output node (Out_P) and a second output node (Out_N). The current path circuitry is coupled to the output nodes and a reference node. The current path circuitry is to enhance current flow between at least one of the output nodes and the reference node, in response to a clock signal.

25 Claims, 8 Drawing Sheets

(56) References Cited

OTHER PUBLICATIONS

Dickson, T., et.al., A 12 Gb/s 11-mW Half-Rate Sampled 5-Tap Decision Feedback Equalizer With Current-Integrating Summers in 45-nm SOI CMOS Technology, IEEE Journal of Solid-State Circuits, Apr. 2009, pp. 1298-1305, vol. 44, No. 4, IEEE, Piscataway, NJ, USA.

Ibrahim, S., Razavi, B., A 20Gb/s 40mW Equalizer in 90nm CMOS Technology, ISSCC 2010/Session 8/ High-Speed Wireline Transceivers/8.8, 2010 IEEE International Solid-State Circuits Conference, Feb. 9, 2010, pp. 170-173, University of California, Los Angeles, CA.

Ibrahim, S., Razavi, B., Low-Power CMOS Equalizer Design for 20-Gb/s Systems, IEEE Journal of Solid-State Circuits, Jun. 2011, pp. 1321-1336, vol. 46, No. 6, IEEE, Piscataway, NJ, USA.

Yuan, F., et.al., Design techniques for decision feedback equalisation of multi-giga-bit-per-second serial data links: a state-of-the-art review, IET Circuits, Devices & Systems, 2014, pp. 118-130, vol. 8, Issue 2, The Institution of Engineering and Technology, London, UK.

Navid, R., et.al., A 40 Gb/s Serial Link Transceiver in 28 nm CMOS Technology, IEEE Journal of Solid-State Circuits, Apr. 2015, pp. 814-827, vol. 50, No. 4, IEEE, Piscataway, NJ, USA.

Lee, J., et.al., Design of 56 Gb/s NRZ and PAM4 SerDes Transceivers in CMOS Technologies, IEEE Journal of Solid-State Circuits, Sep. 2015, pp. 2061-2073, vol. 50, No. 9, IEEE, Piscataway, NJ, USA.

Razavi, B., A Circuit for All Seasons: The StrongARM Latch, IEEE Solid-State Circuits Magazine, Jun. 25, 2015, pp. 12-17, Spring 2015, IEEE, Piscataway, NJ, USA.

Park, H.W., et.al., Current-Integrating DFE with Sub-UI ISI Cancellation for Multi-Drop Channels, Journal of Semiconductor Technology and Science, Feb. 1, 2016, pp. 112-117, vol. 16, No. 1, IEIE, Seoul, Korea.

Turker, D., et.al., A 19Gb/s 38 mW 1-Tap Speculative DFE Receiver in 90nm CMOS, 2009 Symposium on VSLI Circuits, Jun. 16-18, 2009, Kyoto, Japan, pp. 1-26, published Aug. 18, 2009, IEEE, Piscataway, NJ, USA. http://researcher.watson.ibm.com/researcher/files/us-sasha/19Gbps_DFE_Didem_C21-1_vlsi09.pdf.

Schinkel, D., et al., A Double-Tail Latch-Type Voltage Sense Amplifier with 18 ps Setup+hold Time, 2007 IEEE International Solid-State Circuits Conference (ISSCC) Digest of Technical Papers, Feb. 11-15, 2007, San Francisco, CA, pp. 314, 315, 605, published Jun. 18, 2007, IEEE, Piscataway, NJ, USA.

Gao, H., et al., Low Voltage Comparator for High Speed ADC, Proceedings of International Symposium on Signals, Systems and Electronics (ISSSE2010), Sep. 17-20, 2010, Nanjing, China, published Oct 21, 2010, IEEE, Piscataway, NJ, USA.

Babayan-Mashhadi, S., Lofti, R., Analysis and Design of a Low-Voltage Low-Power Double-Tail Comparator, IEEE Transactions on a Very Large Scale Integration (VLSI) Systems, Feb. 2014, pp. 343-352, vol. 22, No. 2, IEEE, Piscataway, NJ, USA.

You, Y., et.al., A 21-Gb/s, 0.96-pJ/bit Serial Receiver with Non-50% Duty-Cycle Clocking 1-Tap, Decision Feedback Equalizer in 65nm CMOS, IEEE Asian Solid-State Circuits Conference, Nov. 9-11, 2015, pp. 1-4, Xiamen, Fujian, China, IEEE, Piscataway, NJ, USA.

* cited by examiner

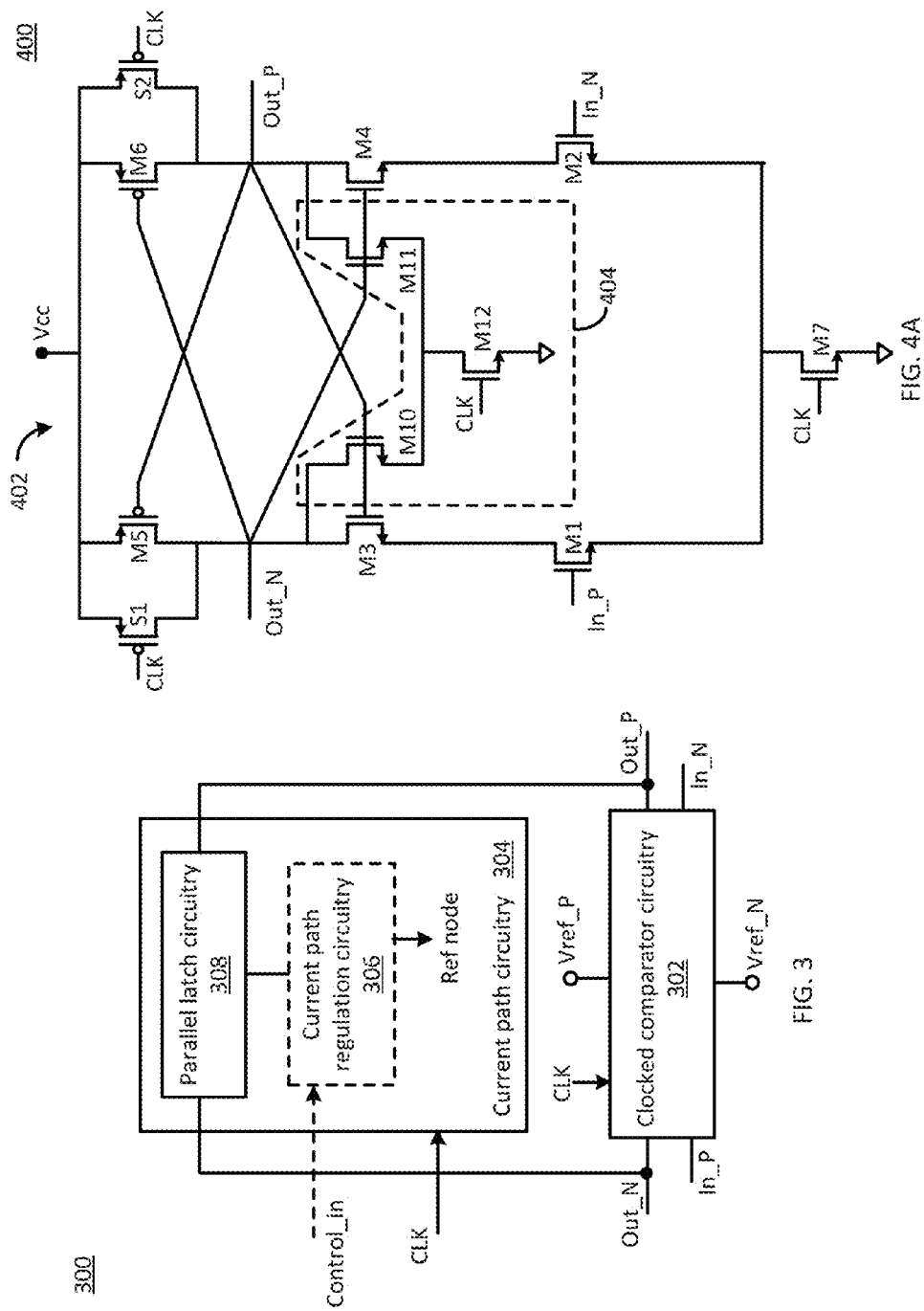

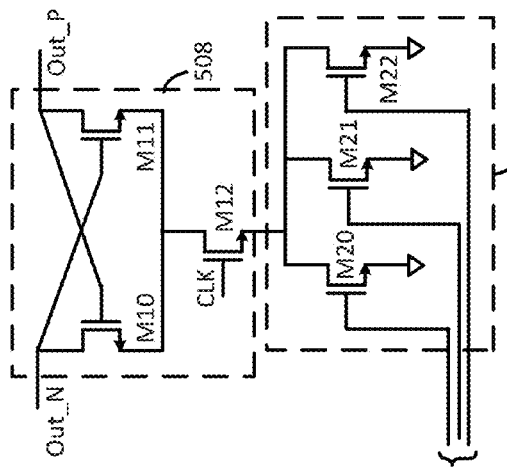
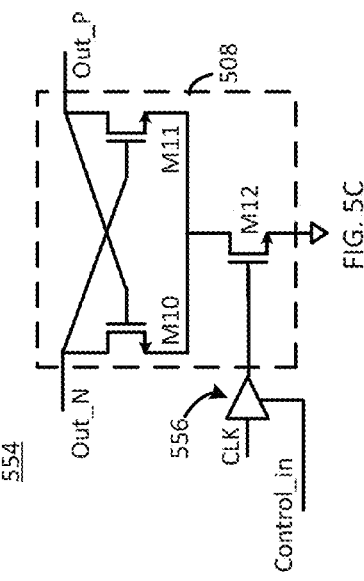
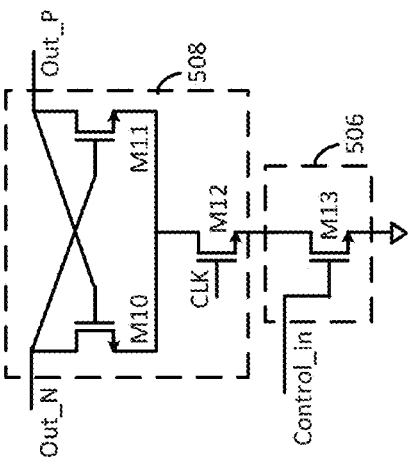
FIG. 5A
FIG. 5B
FIG. 5C

SLICER AND DECISION FEEDBACK EQUALIZATION CIRCUITRY

FIELD

The present disclosure relates to a slicer and decision feedback equalization circuitry, in particular to, enhanced slicer circuitry and decision feedback equalization circuitry.

BACKGROUND

Receivers utilized in communication systems (e.g., Ethernet physical layer (PHY)) may include Decision feedback equalizers (DFE). The receivers are configured to receive transmitted digital data that has been serialized and modulated onto a carrier signal and transmitted over a channel and to recover the digital data. The received signal may be degraded by non-ideal characteristics of the channel (e.g., finite bandwidth). As a result, a sample of the received signal corresponding to a digital data bit may include contributions from previously transmitted bits (i.e., inter-symbol interference). DFEs are configured to utilize one or more prior decisions to reduce the effects of inter-symbol interference to facilitate recovery of the transmitted digital data.

Increasing data rates to on the order of tens and/or hundreds of gigabits per second (Gbps) creates challenges for DFE circuitry. For example, DFE circuitry contains a feedback loop and the feedback timing may be limited by the TCO (timing from clock to output) of clocked comparator circuitry (i.e., decision element) included in the DFE circuitry. Thus, operation of the DFE circuitry may be constrained by characteristics of the clocked comparator circuitry. Increasing the speed and/or the accuracy of the clocked comparator circuitry may result in an increase in size and/or an increase in power consumption of the DFE and associated receiver.

DFE circuitry may include a plurality of taps. Each tap corresponds to a respective prior decision weighted by a respective weight. Respective outputs of each tap of a plurality of taps are typically combined with a representation of the received signal, e.g., input data, in a summation node. Each tap acts as a load on the summation node and thus, may limit the bandwidth of the feedback loop. As the number of taps increases, the resulting load increases and the associated bandwidth may decrease. Bandwidth limitations may then result in an increased delay between an input to the DFE circuitry and an output from the DFE circuitry. Such delay can detrimentally affect timing, particularly at relatively high frequencies and corresponding relatively high data rates. The bandwidth limitations may limit loop gain. The limited loop gain may then be compensated by an increase in a number of variable gain amplifier (VGA) stages preceding the DFE circuitry. Increasing the number of VGA stages may increase a size and/or power consumption of the receiver circuitry.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIG. 3 illustrates an enhanced slicer circuitry, consistent with several embodiments of the present disclosure;

FIGS. 4A, 4B and 4C illustrate an example enhanced N-type slicer, an example enhanced N-type low kickback slicer and an example enhanced P-type slicer, respectively, consistent with several embodiments of the present disclosure;

FIGS. 5A, 5B and 5C illustrate three example current path circuitries including respective current path regulation circuitries, consistent with several embodiments of the present disclosure;

Figure 1A:
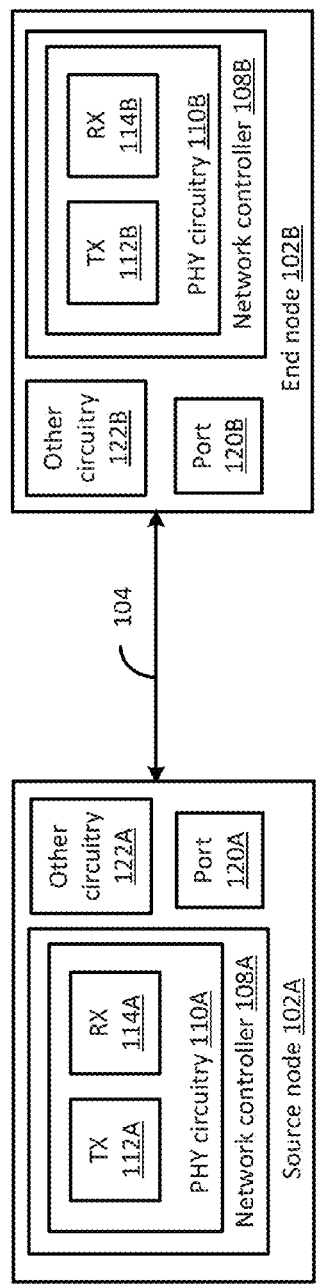
FIG. 1A illustrates a functional block diagram of a network system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to an enhanced slicer and/or decision feedback equalization (DFE) circuitry. The DFE circuitry includes a slicer that may or may not be enhanced. As used herein, "slicer" corresponds to an internal latch comparator (i.e., a clocked comparator) that includes comparator circuitry and a latch circuitry. In some embodiments, the clocked comparator may be coupled to current path circuitry. The current path circuitry is configured to enhance current flow between at least one output node of the clocked comparator and a reference node (e.g., a supply voltage or ground) of the clocked comparator, in response to a clock signal. Thus, as used herein, an "enhanced slicer" corresponds to a combination of a clocked comparator and current path circuitry.

The current path circuitry is configured to reduce a duration of a time interval between the slicer exiting a reset state and outputting a decision. The reset state may be exited based, at least in part, on a clock signal. The decision corresponds to the slicer output achieving a stable value. In other words, in response to a clock trigger (e.g., a rising or falling edge and/or a change of state), a differential output of the slicer may begin to transition from a zero value to a positive or negative value. Whether the differential slicer output transitions to a positive or negative value depends, at least in part, on the relative voltages applied to the differential inputs of the clocked comparator. The current path circuitry is configured to reduce a duration of a time interval between the clock trigger and the slicer entering a positive feedback phase.

The current path circuitry is further configured to increase a trans conductance of a slicer (i.e., increase a ratio of a change in output current, e.g., $I_{DS}$, to a change in input voltage, e.g., $V_{GS}$). Operation of the clocked comparator is triggered by the clock signal and an impedance of the current path between the output nodes and the reference node of the clocked comparator depends on the relative voltages applied to the differential inputs of the clocked comparator. Operation of the current path circuitry is generally controlled by the clock signal. The impedance of the current path provided by the current path circuitry does not depend on the relative voltages applied to the differential inputs of the clocked comparator. In response to the clock signal, current flow through the current path circuitry may reduce a time interval between the clock signal and the clocked comparator entering the positive feedback phase. Thus, an enhanced slicer, consistent with the present disclosure, may be utilized in a relatively high frequency receiver without a decrease in sensitivity and/or without an increase in power consumption.

DFE circuitry may generally include summation node circuitry, a slicer, a set/reset (SR) latch and one or more additional (e.g., DFE) latches. The summation node circuitry is configured to combine (e.g., sum) an input signal and one or more tap outputs. Each tap output corresponds to a weighted prior decision. The weights are related to channel characteristics, e.g., channel bandwidth. An output of the summation node circuitry may then correspond to an equalized representation of the input signal. The output of the summation node circuitry may then be provided to the slicer and utilized for determining a current decision.

In some embodiments, the DFE circuitry may be configured to close at least some of a number of decision feedback loops onto a reference input signal (i.e., at a reference summation node) rather than onto a data input signal (i.e., at a data summation node). In one example, all of the decision feedback loops may be coupled to the reference summation node. In another example, some of the decision feedback loops may be coupled to the reference summation node and some of the decision feedback loops may be coupled to the data summation node.

Closing the feedback loop on the reference summation node is configured to reduce a load (e.g., parasitic capacitance) on the data input and to, thus, facilitate high-speed operation of the DFE circuitry. Gain penalties associated with closing the feedback loop on the data summation node may be avoided. Closing the feedback loop on the reference summation node may facilitate equalizing each eye of a multilevel modulation technique, e.g., four level pulse amplitude modulation PAM4. In other words, each voltage reference may be equalized separately, thus equalizing each eye independently. Thus, amplitude-dependent channel characteristics and/or receiver gain stages that are not linear may be accommodated.

Closing the feedback loop on the reference summation node, using current summation techniques, avoids bandwidth penalties that may be associated with closing the feedback loop on the data summation node. Closing the feedback loop on the reference summation node may be combined with other techniques, e.g., loop unrolling, cascaded summation nodes, integrated summation, etc.

Thus, relatively high data rates may be accommodated utilizing an enhanced slicer and/or closing a DFE feedback loop on a reference node.

FIG. 1A illustrates a functional block diagram of a network system 100 consistent with several embodiments of the present disclosure. Network system 100 includes a source node 102A, an end node 102B and a communications link 104. Each node 102A, 102B includes a respective network controller 108A, 108B. Each source node 102A, 102B includes respective other circuitry 122A, 122B that may include, for example, processor circuitry, memory, a network application, etc. (not shown), configured to communicate via network controllers 108A, 108B and communications link 104.

Each network controller 108A, 108B includes a respective physical layer (PHY) circuitry 110A, 110B configured to interface the source node 102A with the end node 102B, via communications link 104. PHY circuitry 110A, 110B may comply or be compatible with, an Institute of Electrical and Electronic Engineers (IEEE) 802.3™ Ethernet communications protocol, as described herein. As used herein, "Ethernet PHY" corresponds to PHY circuitry (e.g., PHY circuitry 110A and/or 110B) that complies and/or is compatible with one or more IEEE 802.3™ Ethernet communications protocols, as described herein. The IEEE 802.3™ Ethernet communication protocol may include, for example, single-lane PHY protocols such as 10GBASE-KX, 10GBASE-KR, etc., and/or multi-lane PHY protocols such as 10GBASE-KX4, 40GBASE-KR4, 40GBASE-CR4, 100GBASE-CR10, 100GBASE-CR4, 100GBASE-KR4, and/or 100GBASE-KP4, etc., and/or other PHY circuitry that is compliant with the IEEE 802.3™ Ethernet communications protocol and/or compliant with an after-developed communications protocol and/or emerging PHY technology specifications such as 25GBASE-CR and/or 25GBASE-KR, etc.

Each PHY circuitry 110A, 110B includes a respective transmit circuitry (Tx) 112A, 112B and a respective receive circuitry (Rx) 114A, 114B. Tx 112A is configured to transmit data packets and/or frames to the end node 102B, via link 104, and receive circuitry 114A is configured to receive data packets and/or frames from the end node 102B, via link 104. Similarly, Tx 112B is configured to transmit data packets and/or frames to the source node 102A, via link 104, and Rx 114B is configured to receive data packets and/or frames from the source node 102A, via link 104. Of course, each PHY circuitry 110A, 110B may also include encoding/decoding circuitry (not shown) configured to perform analog-to-digital and digital-to-analog conversion, encoding and decoding of data, analog parasitic cancellation (for example, cross talk cancellation), and recovery of received data. Each Rx 114A, 114B may include phase lock loop circuitry (PLL, not shown) configured to coordinate timing of data reception from the respective transmitting node 102B, 102A.

Source node 102A and end node 102B may each include respective ports 120A, 120B which define the number of lanes of the source node 102A and end node 102B, respectively. Each lane of the port 120A, 120B may include a plurality of logical and/or physical channels (e.g., differential pair channels) that provide separate connections between, for example, the Tx 112A and Rx 114A of the source node 102A and the Rx 114B and Tx 112B, respectively, of the end node 102B. A "single-lane link", as used herein, is defined as a single Tx/Rx transmission pair. A "multi-lane link", as used herein, is defined as two or more Tx/Rx transmission pairs. "Link width", as used herein, refers to the number of lanes in the communication link. The PHY circuitry 110A, 110B of each network controller 108A, 108B may be duplicated, depending on the number of lanes associated with the respective port 120A, 120B. Thus for example, port 120A may include a 4-lanes and the PHY circuitry 110A may be compliant with 10GBASE-KX4, 40GBASE-KR4, 40GBASE-CR4, 100GBASE-CR4, 100GBASE-KR4, and/or 100GBASE-KP4.

Figure 1B:
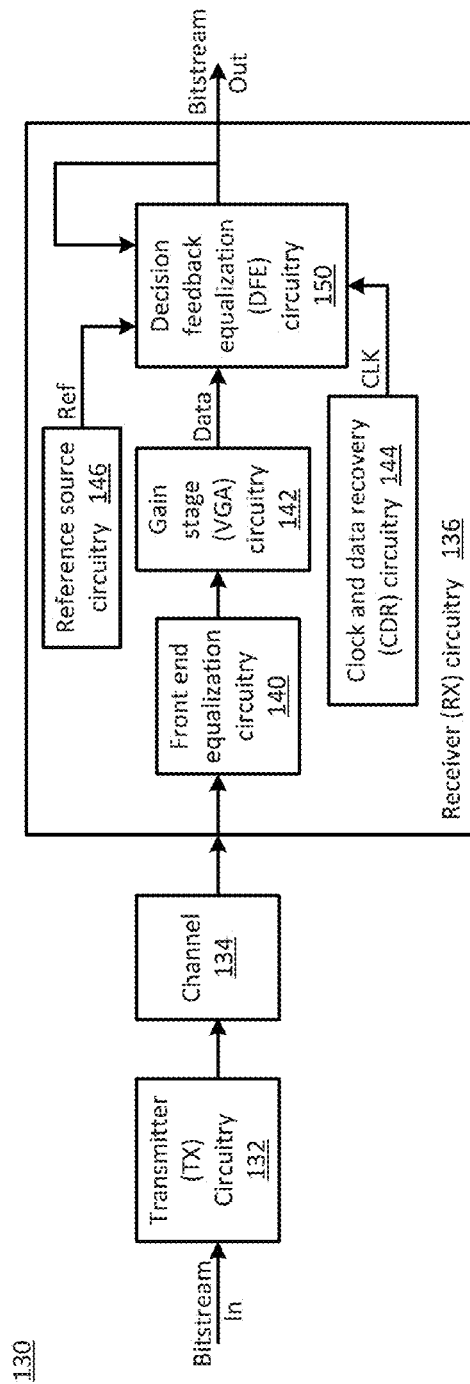
FIG. 1B illustrates a functional block diagram of a communication system including transmitter circuitry, a channel and receiver circuitry consistent with several embodiments of the present disclosure.

FIG. 1B illustrates a functional block diagram of a communication system 130, including a transmitter circuitry 132, a channel 134 and a receiver circuitry 136, consistent with several embodiments of the present disclosure. Transmitter circuitry 132 corresponds to Tx circuitry 112A and/or 112B of FIG. 1B. Receiver circuitry 136 is one example of Rx circuitry 114A and/or 114B. Channel 134 may be included in communications link 104. Thus, PHY circuitry 110A and/or 110B may contain receiver circuitry 136 and transmitter circuitry 132, channel 134 and/or receiver circuitry 136 may comply and/or be compatible with one or more communication protocols, e.g., one or more IEEE 802.3™ standards, as described herein.

The transmitter circuitry 132 is configured to receive a serial data input, e.g., Bitstream In, to modulate the input serial data onto a carrier signal and to transmit the modulated data signal onto channel 134. Channel 134 is configured to carry the data signal to receiver circuitry 136. For example, channel 134 may include wire(s), printed circuit board trace(s), fiber-optic link(s), etc. Receiver circuitry 136 is configured to receive the data signal, to recover the transmitted data and to provide a serial data output, e.g., Bitstream out.

Transmitter circuitry 132, channel 134 and/or receiver circuitry 136 may be configured to transmit, carry, and/or receive serial data at a data rate. For example, the data rate may be of on the order of 0.1, 1, 10 or 100 Gb per second. For example, the data rate may be greater than or equal to 25 Gb per second. In one example, the data rate may be 50 Gb per second. In another example, the data rate may be 100 Gb per second. In another example, the data rate may be less than 25 Gb per second.

Channel 134 may exhibit one or more non-ideal characteristics including, but not limited to, finite bandwidth, etc. Transmitter circuitry 132, channel 134 and/or receiver circuitry 136 may also be susceptible to noise and/or introduce noise into the transmitted serial data, the modulated data signal and/or received serial data. The nonideal characteristics of the channel 134 may result in intersymbol interference in the data signal at the receiver 136.

Receiver circuitry 136 may include front end equalization circuitry 140, gain stage (variable gain amplifier (VGA)) circuitry 142, clock and data recovery (CDR) circuitry 144, reference source circuitry 146 and decision feedback equalization (DFE) circuitry 150. The front end equalization circuitry 140 is configured to account for at least some nonideal channel characteristics. In other words, the front end equalization circuitry 140 is configured to filter the received data signal. For example, front end equalization circuitry 140 may include continuous time linear equalization (CTLE) circuitry. In another example, front end equalization circuitry 140 may include feedforward equalization (FFE) circuitry.

Gain stage circuitry 142 is configured to amplify the received data signal that is output from the front end equalization circuitry 140. The received data signal output from the front end equalization circuitry 140 may be filtered. Gain stage circuitry 142 may include one or more variable gain amplifiers. Increasing the number of variable gain amplifiers may increase in the amount of gain (e.g., amplification) of gain stage circuitry 142. Increasing the number of VGAs may increase a physical size and/or power consumption of receiver circuitry 136. Clock and data recovery circuitry 144 is configured to recover a clock signal from the received serial data. Reference source circuitry 146 may include, e.g., a power supply (voltage or current) and/or ground. Reference source circuitry 146 is configured to provide a reference voltage (e.g., a non-zero voltage or ground) to DFE circuitry 150. DFE circuitry 150 is configured to receive input data (e.g., a filtered and amplified input data stream) from VGA circuitry 142, a reference signal from reference source circuitry 146 and the clock signal from CDR circuitry 144. DFE circuitry 150 is further configured to provide an output, e.g., Bitstream out, that contains serial data recovered from the received serial data. The received serial data is related to the transmitted serial data.

Figure 2:
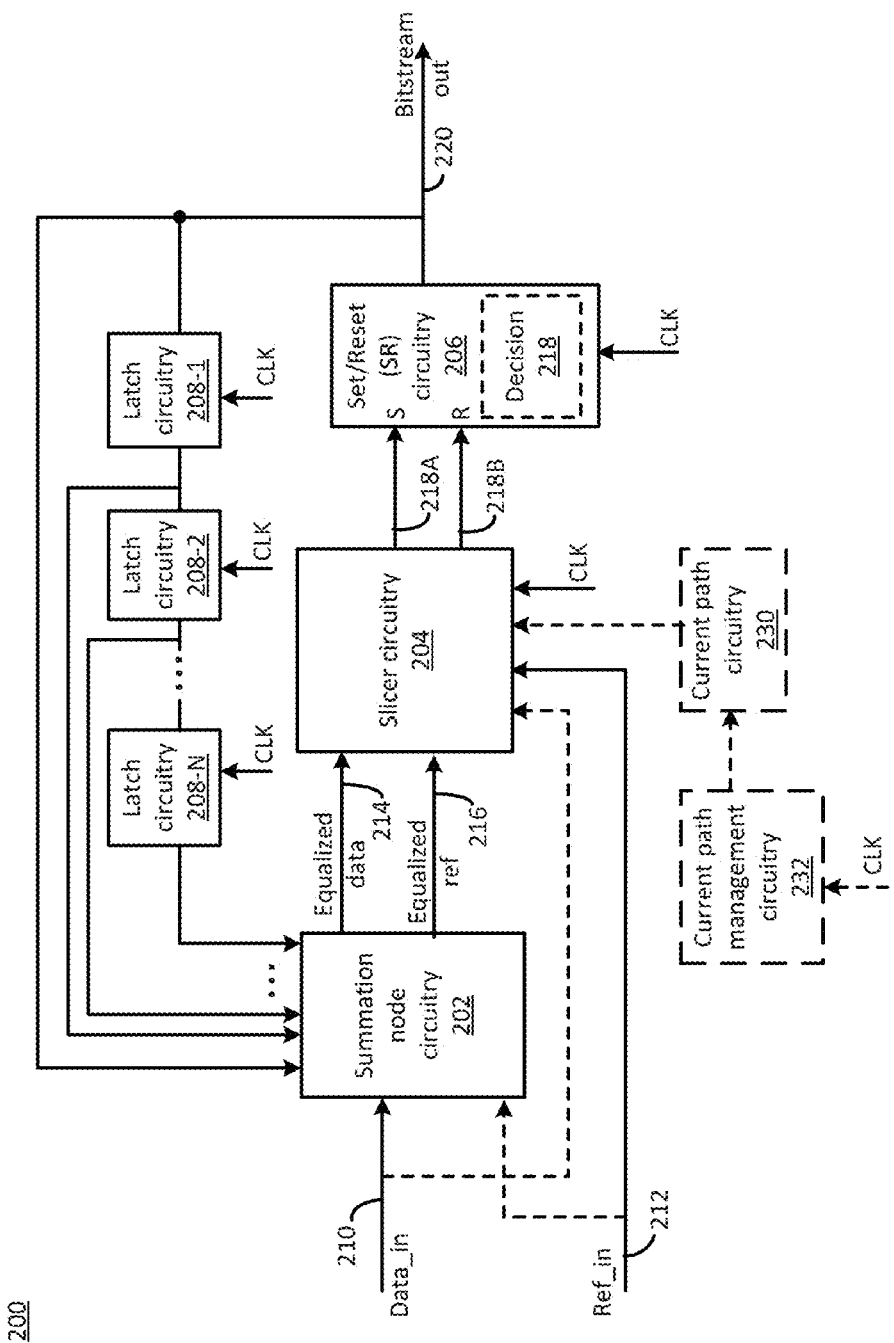
FIG. 2 illustrates decision feedback equalization (DFE) circuitry consistent with several embodiments of the present disclosure.

FIG. 2 illustrates decision feedback equalization (DFE) circuitry consistent 200 with several embodiments of the present disclosure. DFE circuitry 200 is one example of DFE circuitry 150 of FIG. 1B. DFE circuitry 200 includes summation node circuitry 202, slicer circuitry 204, set/reset (SR) circuitry 206 and one or more DFE latches, e.g., latch circuitries 208-1, 208-2, . . . , 208-N. As used herein, the terms "slicer", "clocked comparator", "latch comparator" and "internal latch comparator" are used interchangeably. Slicer circuitry 204 may thus contain a comparator circuitry and a latch circuitry, as will be described in more detail below. An initial state of the slicer circuitry 204 may be a reset state. Slicer circuitry 204 compare and latch operations are triggered by a clock signal, CLK. For example, slicer circuitry 204 may contain a single stage latch comparator, e.g., a "strong arm" latch comparator. In another example, slicer circuitry 204 may contain a two stage latch comparator, e.g., a "double tail" latch comparator, that includes a first stage clocked comparator circuitry and a second stage clocked comparator circuitry.

Summation node circuitry 202 is configured to receive one or more outputs of one or more of latch circuitries 208-1, 208-2, . . . , 208-N. In some embodiments, summation node circuitry 202 may correspond to data summation node circuitry configured to receive input data, Data_in 210 and to output equalized data 214, as will be described in more detail below. In these embodiments, slicer circuitry 204 may be configured to receive a reference in signal, Ref_in 212. In some embodiments, summation node circuitry 202 may correspond to reference summation node circuitry configured to receive Ref_in 212 and to output an equalized reference 216, as will be described in more detail below. In these embodiments, slicer circuitry 204 may be configured to receive Data_in 210. In some embodiments, summation node circuitry 202 may include both data summation node circuitry and reference node circuitry, as will be described in more detail below. In these embodiments, slicer circuitry 204 may be configured to receive both equalized data 214 and equalized reference 216.

Slicer circuitry 204 is further configured to receive a clock signal (CLK). Slicer circuitry 204 is configured to provide a differential slicer output 218A, 218B, that may be received by set/reset (SR) circuitry 206. For example, SR circuitry 206 may correspond to a set/reset (SR) latch. SR circuitry 206 is configured to store a decision 218 that corresponds to the differential slicer output signal 218A, 218B. An output of SR circuitry 206 may then correspond to one bit of recovered data, e.g., one bit of Bitstream Out 220.

Bitstream out 220 may be input to a first latch circuitry 208-1 and to summation node circuitry 202. An output of the first latch circuitry 208-1 may be input to a second latch circuitry 208-2 and to summation node circuitry 202, and so on to Nth latch circuitry 208-N. Each latch circuitry 208-1, 208-2, . . . , 208-N is configured to temporarily store one output bit (i.e., decision). For example, SR circuitry 206 may store decision Do, latch circuitry 208-1 may store prior decision $D_{-1}$, latch circuitry 208-2 may store prior decision $D_{-2}$ and so on to latch circuitry 208-N that may store decision $D_{-N}$. For each decision, the subscript corresponds to a prior decision index. Each stored output bit may then be provided to summation node circuitry 202 and utilized to mitigate intersymbol interference, as described herein.

In some embodiments, DFE 200 may include current path circuitry 230 coupled to slicer circuitry 204. Thus, as used herein, the combination of slicer circuitry 204 and current path circuitry 230 corresponds to enhanced slicer circuitry. In these embodiments, DFE 200 may further include current path management circuitry 232 coupled to current path circuitry 230, as will be described in more detail below.

FIG. 3 illustrates an enhanced slicer circuitry 300, consistent with several embodiments of the present disclosure. Enhanced slicer circuitry 300 includes a clocked comparator circuitry 302 and a current path circuitry 304. Clocked comparator circuitry 302 is configured to receive a clock signal, CLK, and is coupled to reference voltages Vref_P and Vref_N. Clocked comparator circuitry 302 is configured to receive a differential input signal at input nodes In_P and In_N and to provide a differential output signal at output nodes Out_P and Out_N. In operation, if a voltage at In_P (Vin_P) is greater than a voltage at In_N (Vin_N) then, at steady-state, a voltage at Out_P (Vout_P) is configured to equal Vref_P and a voltage at Out_N (Vout_N) is configured to equal Vref_N. Conversely, if Vin_P is less than Vin_N then, at steady-state, output Vout_P is configured to equal Vref_N and output Vout_N is configured to equal Vref_P. For example, Vref_P may equal a positive supply voltage, Vcc, and Vref_N may correspond to a negative supply voltage, e.g., ground (i.e., zero Volts).

Current path circuitry 304 corresponds to current path circuitry 230 of FIG. 2. Current path circuitry 304 includes parallel latch circuitry 308 and may include current path regulation circuitry 306. Parallel latch circuitry 308 is coupled to enhanced slicer output nodes, Out_N and Out_P. Current path circuitry 304 is coupled to clock signal, CLK. Parallel latch circuitry 308 is coupled to CLK directly or, in some embodiments, via current path regulation circuitry 306. Parallel latch circuitry 308 may be directly coupled to a reference node (Ref node) when current path regulation circuitry 306 is not present. In embodiments that include current path regulation circuitry 306, parallel latch circuitry 308 may be coupled to Ref node via current path regulation circuitry 306, as described herein.

Current path circuitry 304 is configured to provide an additional current path between at least one output node Out_P and/or Out_N, and Ref node. Current path circuitry 304 is configured to enhance the current flow between at least one output node Out_P and/or Out_N, and Ref node, in response to a clock signal, CLK. The additional current path is configured to reduce the time interval between receipt of a clock trigger and clocked comparator circuitry 302 entering the positive feedback phase. In other words, the additional current path is configured to speed up the transition of clocked comparator circuitry 302 from the reset state to the positive feedback phase, in response to the clock signal CLK.

In some embodiments, current path circuitry 304 may include current path regulation circuitry 306. Current path regulation circuitry 306 is configured to regulate the enhanced current flow between the output node(s), Out_P and/or Out_N, and the reference node, Ref node. Current path regulation circuitry 306 is configured to be controllable and thus, the corresponding effect of current path circuitry 304 on the operation of enhanced slicer 300 may likewise be controllable, i.e., adjustable. For example, the control may correspond to voltage control, digital control and/or time-based control, as will be described in more detail below. In some embodiments, current path circuitry 304 may not include current path regulation circuitry 306. In these embodiments, parallel latch circuitry 308 may be directly coupled to the reference node and the effect of current path circuitry 304 (e.g., enhanced current flow) on the operation of enhanced slicer 300 may be fixed.

Current path circuitry 304 is configured to provide a current path between the output nodes Out_P and Out_N and the Ref node that is relatively independent of the input voltages at the input nodes In_P and In_N. The current path circuitry 304 is configured to reduce a duration of a time interval between the clock signal CLK enabling clocked comparator circuitry 302 and the clocked comparator circuitry 302 entering a positive feedback phase. Decreasing the duration of this time interval is configured to decrease a decision time interval, e.g., a duration of a time interval between the clock trigger and a decision by enhanced slicer 300.

Figures 4B, 4C:
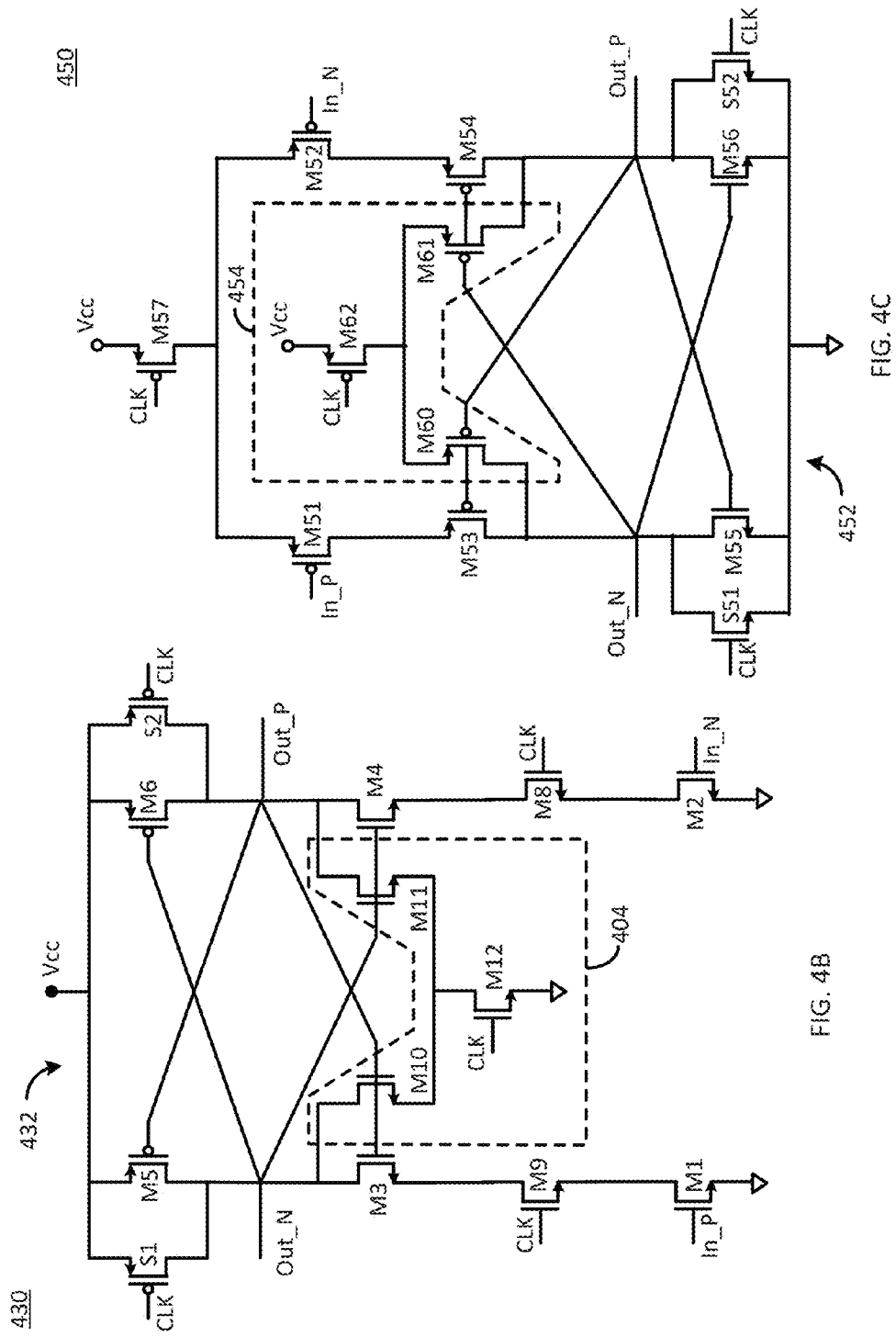

FIGS. 4A, 4B and 4C illustrate an example enhanced N-type slicer 400, an example enhanced N-type low kickback slicer 430 and an example enhanced P-type slicer 450, respectively, consistent with several embodiments of the present disclosure. The example enhanced slicers 400, 430, 450 are each respective examples of enhanced slicer 300 of FIG. 3. The example enhanced low kickback N-type slicer 430 is configured to operate similar to the enhanced N-type slicer 400 with transistors M8 and M9 instead of transistor M7, as described herein. The example enhanced P-type slicer 450 is configured to operate similar to the enhanced N-type slicer 400 with the supply and ground nodes swapped and the polarity of the clock trigger opposite the polarity of the clock trigger in the N-type slicer 400.

The example enhanced slicers 400, 430, 450, utilize metal oxide semiconductor field effect transistors (MOSFETs). Of course, in other embodiments, other transistor technologies may be utilized to implement other enhanced slicers, consistent with the present disclosure. Other transistor technologies may include, but are not limited to, bipolar junction transistor (BJT) technologies (e.g., npn BJTs, pnp BJTs, heterojunction BJTs), other field effect transistor (FET) technologies (e.g., junction field effect transistors (JFETs), finFETs, insulated gate FETs (IGFETs), etc.), etc.

Turning first to FIG. 4A, the example enhanced N-type slicer 400 includes a single stage N-type clocked comparator circuitry 402 and current path circuitry 404. N-type clocked comparator circuitry 402 includes two transistor switches, S1, S2. In this example, the transistor switches are P-type MOSFETs. A respective gate of each of transistors S1 and S2 is configured to receive the clock signal CLK. The sources of the two transistors are coupled to supply voltage Vcc (i.e., Vref_P). The drain of transistor S1 is coupled to output node Out_N. The drain of transistor S2 is coupled to output node Out_P.

N-type clocked comparator circuitry 402 further includes transistors M1, M2, M3, M4, M5, M6 and M7. In this example, transistors M1, M2, M3, M4 and M7 are N-type MOSFETs and transistors M5 and M6 are P-type MOSFETs. A gate of transistor M1 is coupled to input node In_P and a gate of transistor M2 is coupled to input node In_N. The sources of transistors M1 and M2 are coupled to each other and to a drain of transistor M7. The gate of transistor M7 is configured to receive the clock signal CLK and the source of transistor M7 is coupled to ground (i.e., Vref_N). The drain of transistor M1 is coupled to the source of transistor M3 and the drain of transistor M2 is coupled to the source of transistor M4. The gate of transistor M3 is coupled to output node Out_P and the gate of transistor M4 is coupled to output node Out_N. The drain of transistor M3 is coupled to output node Out_N and the drain of transistor M4 is coupled to output node Out_P.

The sources of transistors M5 and M6 are coupled to Vcc (i.e., Vref_P). The gate of transistor M5 and the drain of transistor M6 are coupled to each other and to output node Out_P. The gate of transistor M6 and the drain of transistor M5 are coupled to each other and to output node Out_N.

In operation, initially, N-type clocked comparator 402 and, thus, N-type enhanced slicer circuitry 400 may be in a reset state. For example, in the reset state, the clock signal, CLK, may be low, e.g., may be equal to zero. Switches S1 and S2 may thus be on, i.e., conducting, coupling Vcc to Out_N and Out_P. Transistors M5 and M6 may then be off, i.e., not conducting. Output nodes Out_N and Out_P may both be equal to a logic one, i.e., may be equal to supply voltage Vcc. In the reset state, transistor M7 may be off, i.e., not conducting.

When the clock signal, CLK, transitions from low to high, switches S1 and S2 may then turn off, decoupling output nodes Out_N and Out_P from the supply voltage Vcc, and transistor M7 may turn on coupling the sources of transistors M1 and M2 to ground. Transistor M2 and/or transistor M1 may begin to conduct when the voltage applied to the respective input node increases to greater than the threshold voltage of the respective transistor. If the voltage applied to input node In_N is greater than the voltage applied to input node In_P, transistor M2 may begin to conduct before transistor M1 conducts. When transistor M2 begins to conduct, transistor M4 may also conduct providing a current path between output node Out_P and ground. The current path may include transistors M4, M2 and M7. As the voltage on output node Out_P decreases from Vcc toward ground, transistor M5 may turn on when the voltage at output node Out_P minus the voltage at output node Out_N is more negative than the threshold voltage of transistor M5.

Similarly, if the voltage applied to input node In_P is greater than the voltage applied to input node In_N, transistor M1 may begin to conduct before transistor M2 conducts. When transistor M1 begins to conduct, transistor M3 may also conduct providing a current path between output node Out_N and ground. The current path may include transistors M3, M1 and M7. As the voltage on output node Out_N decreases from Vcc toward ground, transistor M6 may turn on when the voltage on output node Out_N minus the voltage on output node Out_P is more negative than the threshold voltage of transistor M6.

Thus, after N-type clocked comparator 402 is enabled (by CLK), the differential voltage across output nodes Out_P and Out_N may correspond to a decision of the clocked comparator 402 based, at least in part, on relative input voltages applied to input nodes In_P, In_N. Current path circuitry 404, in this example, includes transistors M10, M11 and M12. In this example, transistors M10, M11 and M12 are N-type MOSFETs. The sources of transistors M10 and M11 are coupled to each other and to the drain of transistor M12. The drain of transistor M10 is coupled to output node Out_N and the drain of transistor M11 is coupled to output node Out_P. The gate of transistor M10 is coupled to output node Out_P and the gate of transistor M11 is coupled to output node Out_N. The source of transistor M12 is coupled to ground and the gate of transistor M12 is coupled to CLK.

Current path circuitry 404 is one example of current path circuitry 304 of FIG. 3. Current path circuitry 404 does not include current path regulation circuitry. In other words, current path circuitry 404 may be enabled by the clock signal CLK coupled to the gate of transistor M12. Unlike the paths between the output nodes and the reference node via transistors M3, M1 and M7 or transistors M4, M2 and M7, the paths between the output nodes, Out_P, Out_N, and the reference node (e.g., ground) via current path circuitry 404 include only two transistors. The conductance of transistors M10 and M11 are controlled by the voltages Vout_P, Vout_N on the output nodes, Out_P, Out_N, referenced to ground. In other words, the conductances of the transistors M10 and M11 are not directly dependent on the input voltages, Vin_P, Vin_N. Thus, current path circuitry 404 is configured to provide a relatively low impedance path between at least one output node (Out_P, Out_N) and a reference node, e.g., ground, in response to a clock trigger. Current path circuitry 404 is configured to enhance the current flow between at least one output node Out_P and/or Out_N, and ground, in response to CLK.

Turning now to FIG. 4B, the example enhanced low kickback N-type slicer circuitry 430 includes a single stage N-type clocked low kickback comparator circuitry 432 and the current path circuitry 404. The N-type clocked low kickback comparator circuitry 432 is one example of clocked comparator circuitry 302 of FIG. 3. Clocked comparator circuitry 432 is similar to clocked comparator circuitry 402 of FIG. 4A, with the following exceptions. The clocked N-type low kickback comparator 432 does not include transistor M7. The sources of transistors M1 and M2 are coupled to ground. Clocked N-type low kickback comparator circuitry 432 includes transistor M8 coupled drain to source between transistors M2 and M4 and transistor M9 coupled drain to source between transistors M1 and M3. The gates of transistors M8 and M9 are coupled to the clock input CLK. Operation of enhanced low kickback slicer circuitry 430, including current path circuitry 404, is similar to operation of enhanced slicer circuitry 400.

Turning now to FIG. 4C, the example enhanced P-type slicer 450 includes a single stage P-type clocked comparator circuitry 452 and a current path circuitry 454. The clocked P-type comparator circuitry 452 is one example of clocked comparator circuitry 302 and the current path circuitry 454 is one example of current path circuitry 304 of FIG. 3. In this example, current path circuitry 454 includes parallel latch circuitry but does not include current path regulation circuitry.

The single stage P-type clocked comparator circuitry 452 includes two N-type switches S51 and S52 coupled between ground and respective output nodes Out_N and Out_P. The single stage clocked P-type comparator 452 further includes P-type transistors M51, M52, M53, M54 and M57 and N-type transistors M55 and M56. Operation of switches S51 and S52 is similar to operations of switches S1 and S2 of FIG. 4A. Similarly, operation of transistors M51, M52, M53, M54, M55, M56 and M57 is similar to operation of transistors M1, M2, M3, M4, M5, M6 and M7 of FIG. 4A.

Current path circuitry 454 includes transistors M60, M61 and M62. In this example, transistors M60, M61 and M62 are P-type MOSFETs. The drain of transistor M60 is coupled to output node Out_N and the drain of transistor M61 is coupled to output node Out_P. The sources of transistors M60 and M61 are coupled to each other and to the drain of transistor M62. The source of transistor M62 is coupled to a reference node, e.g., supply voltage Vcc, and the gate of transistor M62 is coupled to the clock input signal CLK. Similar to the N-type comparator circuitry 452, current path circuitry 454 is configured to provide an additional current path between at least one output node and a reference node. In this case, the reference node corresponds to the supply voltage, Vcc. The additional current path is configured to decrease a time interval between receiving the clock trigger (e.g., the clock signal changing state) and the P-type clocked comparator circuitry 452 entering the positive feedback phase. Decreasing this time interval is configured to decrease a time interval between the clock trigger and a decision by enhanced slicer circuitry 450. In other words, the conductances of the transistors M60 and M61 are not directly dependent on the voltages at input nodes In_P, In_N. Thus, current path circuitry 454 is configured to provide a relatively low impedance path to a reference node, e.g., ground, in response to a clock trigger. Current path circuitry 454 is configured to enhance the current flow between at least one output node Out_P and/or Out_N, and Vcc, in response to CLK.

Thus, example enhanced slicer circuitries 400, 430, 450, including current path circuitries 404, 454, are configured to provide an additional current path between at least one output node, Out_P, Out_N, and a reference node. The current path circuitries 404, 454 are configured to enhance the current flow between at least one output node Out_P and/or Out_N, and the reference node, in response to CLK. The additional current path is configured to decrease a time interval between receiving the clock trigger and the clocked comparator entering the positive feedback phase. Decreasing the duration of this time interval is configured to decrease a time interval between the clock trigger and a decision by example enhanced slicer circuitry 400, 430, 450.

The respective current path circuitries 404, 434, 454, of FIGS. 4A, 4B, 4C correspond to respective parallel latch circuitries. In other words, in the example enhanced slicer circuitries 400, 430, 450, the respective current path circuitries 404, 434, 454 do not include current path regulation circuitry, as described herein. It should be noted that any of the current path circuitries 404, 434, 454 may be modified to include current path regulation circuitry, as described herein, within the scope of the present disclosure.

FIGS. 5A, 5B and 5C illustrate three example current path circuitries 504, 534, 554, including respective example current path regulation circuitries 506, 536, 556, consistent with several embodiments of the present disclosure. Each example current path circuitry 504, 534, 554 is a respective example of current path circuitry 304 of FIG. 3. Each example current path circuitry 504, 534, 554 is configured to enhance current flow between at least one output node, Out_N, Out_P, and a reference node. Each example current path circuitry 504, 534, 554 includes a respective example of current path regulation circuitry 506, 536, 556. Each example current path regulation circuitry 506, 536, 556 is configured to regulate the enhanced current flow between at least one output node, Out_N, Out_P, and a reference node. Current path regulation circuitry 506 is one example of a voltage controlled current path regulation circuitry. Current path regulation circuitry 536 is one example of a digitally controlled current path regulation circuitry. Current path regulation circuitry 556 is one example of a time-based current path regulation circuitry.

An amount of current path regulation may be set in advance and/or may be adjusted during operation. In some embodiments, the amount of current path regulation may be set and/or adjusted based, at least in part, on one or more operational parameters including, but not limited to, data rate, bit error rate (BER), etc. For example, for relatively higher data rates, the current path regulation circuitry may be configured to pass a relatively higher current through the current path circuitry. In another example, for relatively lower data rates, the current path regulation circuitry may be configured to pass a relatively lower current through the current path circuitry. A relatively higher current may correspond to a relatively faster response (i.e., a relatively shorter TCO).

In some embodiments, the amount of current path regulation may be set for a given data rate based, at least in part, on a specified operating frequency of clocked comparator circuitry that is coupled to the current path circuitry. For example, for a relatively lower specified operating frequency, the current path regulation circuitry may be configured to pass a relatively higher current through the current path circuitry. In another example, for a relatively higher specified operating frequency, the current path regulation circuitry may be configured to pass a relatively lower current through the current path circuitry. Thus, variation in operating frequency may be accommodated.

Each current path circuitry 504, 534, 554 includes parallel latch circuitry 508 and the respective current path regulation circuitry 506, 536, 556, respectively. The parallel latch circuitry 508 is configured to be coupled to output nodes Out_P, Out_N of a clocked comparator, as described herein. Each current path regulation circuitry 506, 536, 556 is a respective example of current path regulation circuitry 306 of FIG. 3. The parallel latch circuitry 508 includes three transistors M10, M11 and M12 that are configured to provide an additional current path between at least one output node and a reference node, as described herein.

The example current path circuitry 504, 534, 554, are illustrated with MOSFETs. Of course, in other embodiments, other transistor technologies may be utilized to implement current path circuitry, consistent with the present disclosure. Other transistor technologies may include, but are not limited to, BJT technologies (e.g., npn BJTs, pnp BJTs, heterojunction BJTs), other FET technologies (e.g., JFETs, finFETs, IGFETs, etc.), etc.

Turning first to FIG. 5A, current path regulation circuitry 506 includes transistor M13. A drain of transistor M13 is coupled to a source of transistor M12 and a source of transistor M13 is coupled to ground (i.e., reference node). A gate of transistor M13 is configured to receive a control input signal, control_in. The gate of transistor M13 may be coupled to, for example, current path management circuitry 232 of FIG. 2. Control_in may then correspond to a controlled bias signal (e.g., a voltage) configured to control the bias on transistor M13 and to thus, increase, decrease or eliminate current flow through current path circuitry 504. Current path management circuitry 232 may be configured to control the bias voltage applied to the gate of transistor M13. For example, for an N-type transistor (M13), Control_in may be set to a relatively higher voltage (i.e., increased current through current path circuitry 504) when sampling at higher frequencies (i.e., lower TCO). In another example, for an N-type transistor (M13), Control_in may be set to a relatively lower voltage, and thus a relatively lower current may flow through current path circuitry 504 at relatively lower frequencies.

Turning now to FIG. 5B, current path regulation circuitry 536 includes three additional transistors M20, M21 and M22. In some embodiments, current path circuitry 534 may include more than three additional transistors or fewer than three additional transistors. The drains of the additional transistors M20, M21 and M22 are coupled to the source of transistor M12. The sources of the additional transistors M20, M21, M22 are coupled to ground (i.e., Ref node). The respective gate of each additional transistor M20, M21, M22 is coupled to a respective digital input signal. The respective digital input signals may be provided by, for example, current path management circuitry 232 of FIG. 2. Control_in may then correspond to the digital input signals provided to the gates of the additional transistors M20, M21, M22. The digital input signals may correspond to respective enable bits. For example, enabling all of the additional transistors M20, M21, M22 is configured to turn the transistors M20, M21, M22 on (i.e., conducting) and may thus correspond to a maximum current flow through current path circuitry 534. In another example, disabling all of the additional transistors M20, M21, M22 may correspond to zero current flow through current path circuitry 534. In another example, enabling some of the additional transistors may correspond to a current flow that is greater than zero and less than the maximum current flow through current path circuitry 534.

Thus, current path circuitry 534 may be digitally controlled. For example, for relatively low frequency input data signals, none or fewer than all of the transistors M20, M21 and M22 may be enabled. Thus, current flow through current path circuitry 534 may be decreased or eliminated when an enhanced slicer that includes current path circuitry 534 is enabled. In another example, for relatively high frequency input data signals, all or nearly all of the transistors M20, M21, M22 may be enabled, increasing current flow through current path circuitry 534, when the enhanced slicer is enabled.

Turning now to FIG. 5C, current path regulation circuitry 556 is one example of time-based control. Current path regulation circuitry 556 corresponds to an adjustable delay circuitry. The gate of transistor M12 is coupled to the clock signal, CLK, through the adjustable delay circuitry 556. Control_in may then correspond to the delay associated with the clock input signal to transistor M12. Adjusting the delay on the clock input signal CLK is configured to adjust a corresponding impact of current path circuitry 554 on operation of an enhanced slicer circuitry that includes current path circuitry 554. The delay on the clock input signal is related to the impact of the current path circuitry 554 on the decision. A relatively longer delay may correspond to a relatively smaller impact on the decision compared to a relatively shorter delay. In other words, a relatively shorter delay corresponds to a relatively longer time for current to flow through current path circuitry 554 and a relatively longer delay corresponds to a relatively shorter time for current to flow through current path circuitry 554. For example, for a relatively higher frequency data signal, the delay may be relatively short, e.g., at or near zero. In another example, or a relatively lower frequency data signal, the delay may be relatively longer.

An enhanced slicer circuitry may thus include any combination of controllable current path circuitry 504, 534, 554 and clocked comparator circuitry, as described herein. Thus, current path regulation circuitries 506, 536 and 556 illustrate examples of voltage control, digital control and time-based control, respectively.

Figure 6:
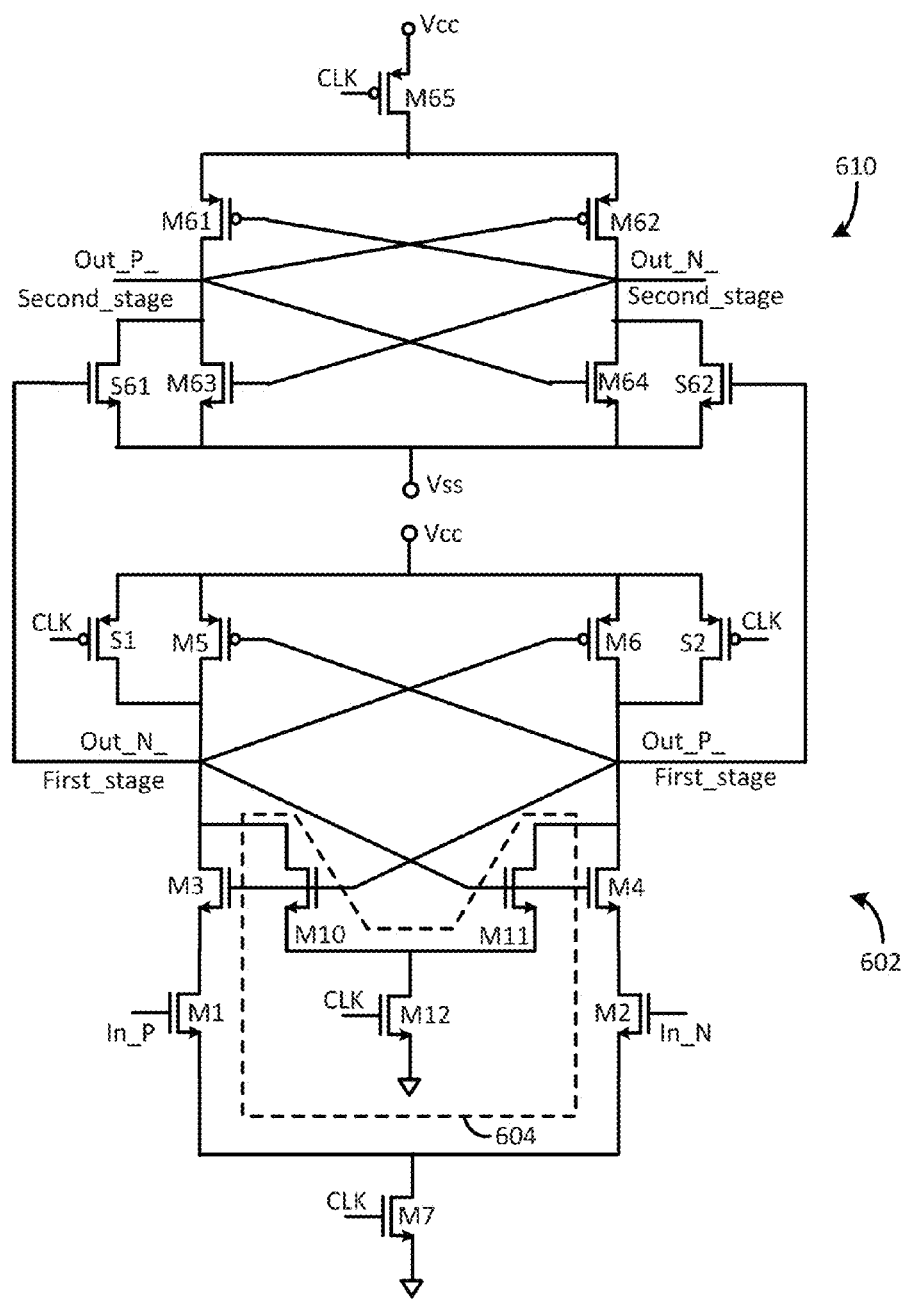
FIG. 6 illustrates one example multistage enhanced slicer that includes current path circuitry consistent with several embodiments of the present disclosure.

FIG. 6 illustrates one example multistage enhanced slicer 600 that includes current path circuitry 604 consistent with several embodiments of the present disclosure. Multistage slicer 600 includes a first stage clocked comparator circuitry 602 and a second stage clocked comparator circuitry 610. The first stage clocked comparator circuitry 602 and second stage clocked comparator circuitry 610, together, may correspond to a double tail topology, as described herein.

The first stage clocked comparator circuitry 602 is coupled to current path circuitry 604. The first stage clocked comparator circuitry 602 and current path circuitry 604 correspond to enhanced slicer circuitry 400 of FIG. 4A. In other words, the first stage clocked comparator circuitry 602 corresponds to clocked comparator circuitry 402 and current path circuitry 604 corresponds to current path circuitry 404 of FIG. 4A. It may be appreciated the current path circuitry 604 may be replaced with any one of current path circuitries 504, 534 or 554 of FIGS. 5A, 5B, 5C, respectively. In other words, current path circuitry 604 may be configured to provide a fixed or controllable current path, as described herein.

The output nodes Out_N_first_stage and Out_P_first_stage of the first stage clocked comparator circuitry 602 are coupled to input nodes of the second stage clocked comparator circuitry 610. The second stage clocked comparator circuitry 610 includes two switches S61, S62 and five transistors M61, M62, M63, M64, M65. The gate of each switch S61 and S62 is coupled to a respective output node of the first stage clocked comparator circuitry 602, Out_N_first_stage and Out_P_first_stage. The sources of switches S61 and S62 are coupled to a voltage supply, Vss. The drain of switch S61 is coupled to a second stage first output node Out_P_second_stage. The drain of switch S62 is coupled to a second stage second output node Out_N_second_stage. Transistors M63 and M64 are N-type transistors. The sources of transistors M63 and M64 are coupled to voltage supply, Vss. A drain of transistor M63 is coupled to output node Out_P_second stage and a drain of transistor M64 is coupled to output node Out_N_second_stage. A gate of transistor M64 is coupled to output node, Out_P_second stage. A gate of transistor M63 is coupled to output node, Out_N_second_stage.

Transistors M61, M62 and M65 are P-type transistors. The gate of transistor M62 is coupled to Out_P_second_stage and the gate of transistor M61 is coupled to Out_N_second_stage. The drain of transistor M61 is coupled to Out_P_second_stage and the drain of transistor M62 is coupled to Out_N_second_stage. The sources of transistors M61 and M62 are coupled to each other and to the source of transistor M65. The drain of transistor M65 is coupled to voltage supply, Vcc, and the gate of transistor M65 is coupled to the clock signal CLK.

Thus, current path circuitry, e.g., current path circuitry 604, may be included in a multistage enhanced slicer. In one example, current path circuitry may be coupled to the first stage outputs, Out_N_first_stage, Out_P_first_stage. In another example, current path circuitry may be coupled to the second stage outputs, Out_N_second_stage, Out_P_second_stage. In another example, a first current path circuitry may be coupled to the first stage outputs, Out_N_first_stage, Out_P_first_stage and a second current path circuitry may be coupled to the second stage outputs, Out_N_second_stage, Out_P_second_stage.

Figure 7:
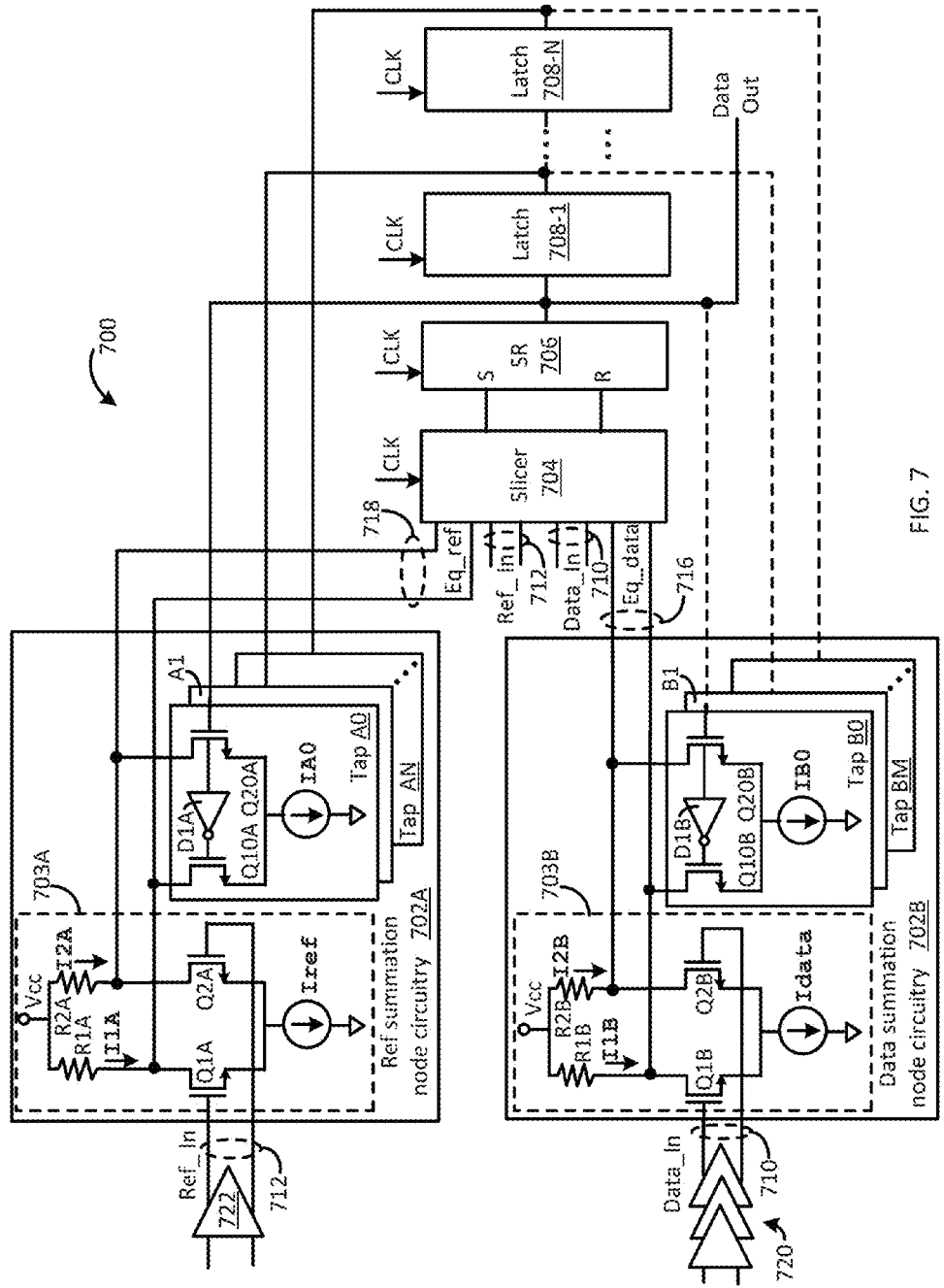
FIG. 7 illustrates a decision feedback equalization (DFE) circuitry consistent with several embodiments of the present disclosure.

FIG. 7 illustrates a decision feedback equalization (DFE) circuitry 700 consistent with several embodiments of the present disclosure. DFE circuitry 700 is one example of DFE circuitry 150 of FIG. 1B. DFE circuitry 700 is configured to receive a differential reference input, Ref_in 712, and a differential data input, Data_in 710. Ref_in 712 may be output of a gain stage 722. Data_in 710 is output from a gain stage 720 that may include one or more variable gain amplifiers (VGAs). Gain stage 720 is one example of gain stage circuitry 142 of FIG. 1B.

DFE circuitry 700 includes a slicer 704, a set/reset (SR) latch 706 and one or more other (i.e., DFE) latches 708-1, . . . , 708-N. In some embodiments, slicer 704 may correspond to an enhanced slicer, as described herein. DFE circuitry 700 may include a reference summation node circuitry 702A and/or a data summation node circuitry 702B, as will be described in more detail below. Summation node circuitry 702A and/or 702B is/are configured to sum an input signal and at least one weighted prior decision, as will be described in more detail below. In an embodiment, summation node circuitry 702A and/or summation node circuitry 702B correspond(s) to current summation node circuitry configured to sum a plurality of electrical currents.

In some embodiments, DFE circuitry 700 may include the reference summation node circuitry 702A and may not include the data summation node circuitry 702B. In these embodiments, slicer 704 is configured to receive an equalized reference input, Eq_ref 718 from reference summation node circuitry 702A. Slicer 704 may be further configured to receive the data input, Data_in 710. In these embodiments, all of the decisions, i.e., all of the outputs, from SR latch 706 and latches 708-1, . . . , 708-N may be fed back to the reference summation node circuitry 702A. Reference summation node 702A may then be configured to sum the reference input signal Ref_in 712 and one or more weighted prior decisions output from SR latch 706 and one or more DFE latches 708-1, . . . , 708-N. Reference summation node 702A may then be configured to output an equalized reference signal, Eq_ref 718. The output equalized reference signal, Eq_ref 718 may the correspond to a slicer reference input.

In some embodiments, DFE circuitry 700 may include the data summation node circuitry 702B and may not include the reference summation node circuitry 702A. In these embodiments, slicer 704 is configured to receive an equalized data input, Eq_data 716. Slicer 704 may be further configured to receive the reference input, Ref_in 712. In these embodiments, all of the decisions, i.e., all of the outputs, from SR latch 706 and latches 708-1, . . . , 708-N may be fed back to the data summation node circuitry 702B. Data summation node 702B may then be configured to sum the data input signal Data_in 710 and one or more weighted prior decisions output from SR latch 706 and one or more DFE latches 708-1, . . . , 708-N. Data summation node 702B may then be configured to output an equalized data signal, Eq_data 716. The output equalized data signal, Eq_data 716 may then correspond to a slicer data input.

In some embodiments, DFE circuitry 700 may include both the reference summation node circuitry 702A and the data summation node circuitry 702B. In these embodiments, slicer 704 is configured to receive Eq_data 716 and Eq_ref 718. In these embodiments, a first portion, i.e., some of the outputs from SR latch 706 and latches 708-1, . . . , 708-N may be fed back to the reference summation node circuitry 702A and a second portion of the outputs from SR latch 706 and latches 708-1, . . . , 708-N may be fed back to the data summation node circuitry 702B. In these embodiments, the first portion and the second portion may not overlap, i.e., may not include a same output from SR latch 706 and latches 708-1, . . . , 708-N. The combination of the first portion and the second portion are configured to include all of the outputs from SR latch 706 and latches 708-1, . . . , 708-N. Reference summation node 702A may then be configured to sum the reference input signal Ref_in 712 and one or more weighted prior decisions output from SR latch 706 and/or one or more DFE latches 708-1, . . . , 708-N. Data summation node 702B may then be configured to sum the data input signal Data_in 710 and one or more weighted prior decisions output from SR latch 706 and one or more DFE latches 708-1, . . . , 708-N. Reference summation node 702A may then be configured to output an equalized reference signal, Eq_ref 718 and data summation node 702B may then be configured to output an equalized data signal, Eq_data 716. The output equalized reference signal, Eq_ref 718 may then correspond to a slicer reference input and the output equalized data signal, Eq_data 716 may then correspond to a slicer data input.

Each summation node circuitry 702A, 702B includes a respective differential amplifier circuitry 703A, 703B and one or more taps A0, A1, . . . , AN and B0, B1, . . . , BM, respectively. Reference differential amplifier 703A includes two reference transistors (e.g., MOSFETs) Q1A and Q2A, a reference current source, Iref, and two resistors R1A, R2A. Respective gates of the reference transistors Q1A, Q2A are coupled to the differential reference input, Ref_in 712. Sources of the reference transistors Q1A, Q2A are coupled to the reference current source Iref. Respective drains of the reference transistors Q1A, Q2A are coupled to a supply voltage Vcc via respective resistors R1A, R2A. A first reference summation current, I1A, through resistor R1A and a second reference summation current, I2A, through resistor R2A are related to Ref_in and the decisions stored to one or more of SR 706 and latches 708-1, . . . , 708-N. The output, Eq_ref 718, of reference summation node circuitry 702A is related to a difference between I1A and I2A. Each reference tap A0, A1, . . . , AN may be coupled to a respective output of SR latch 706 and latches 708-1, . . . , 708-N. For example, reference tap A0 may be coupled to the output of SR latch 706, reference tap A1 may be coupled to an output of latch 708-1 and reference tap AN may be coupled to an output of latch 708-N. Each reference tap A0, A1 . . . , AN includes two reference tap transistors, a reference tap current source and a reference tap inverter. For example, reference tap A0 includes two reference tap transistors Q10A, Q20A, a reference tap current source IA0, and a reference tap inverter D1A. A gate of the first reference tap transistor Q10A is coupled to an output of the reference tap inverter D1A. An input of the reference tap inverter D1A is coupled to a gate of the second reference tap transistor Q20A and the output of SR latch 706. The sources of the reference tap transistors Q10A, Q20A are coupled to the reference tap current source IA0. Respective drains of the reference tap transistors Q10A, Q20A are coupled to respective drains of reference transistors Q1A, Q2A.

A value of a reference tap current provided by each reference tap current source corresponds to a tap weight and may be related to channel characteristics. Each reference tap is configured to add a corresponding reference tap current to, or subtract the corresponding reference tap current from, the reference differential amplifier 703A output. Whether the corresponding reference tap current is added or subtracted is related to the contents of respective latches 706, 708-1, . . . , 708-N, i.e., is related to the decision value stored by each respective latch. Thus, for R1A=R2A=R, Eq_ref is equal to R*(I1A−I2A) where I1A includes contributions from latches storing logic zeros and I2A includes contributions from latches storing logic ones. Whether I1A or I2A includes a contribution from reference current Iref is related to Ref_in 712. If Ref_in 712 is positive, then Iref may be included in I1A and if Ref_in 712 is negative, then Iref may be included in I2A. The differential output of reference summation node circuitry 702A may then correspond to the equalized reference, Eq_ref 718.

Similarly, for data summation node circuitry 702B, data differential amplifier 703B includes two data transistors (e.g., MOSFETs) Q1B and Q2B, a data current source, Idata, and two resistors R1B, R2B. Respective gates of the data transistors Q1B, Q2B are coupled to the differential data input, Data_in 710. Sources of the data transistors Q1B, Q2B are coupled to the data current source Idata. Respective drains of the data transistors Q1B, Q2B are coupled to a supply voltage Vcc via respective resistors R1B, R2B. A first data summation current, I1B, through resistor R1B and a second data summation current, I2B, through resistor R2B are related to Data_in and the decisions stored to one or more of SR 706 and latches 708-1, . . . , 708-N. The output, Eq_data 716, of data summation node circuitry 702B is related to a difference between I1B and I2B.

Each data tap B0, B1, . . . , BM may be coupled to a respective output of SR latch 706 and latches 708-1, . . . , 708-N. For example, data tap B0 may be coupled to the output of SR latch 706, data tap B1 may be coupled to an output of latch 708-1, etc. Each data tap B0, B1, . . . , BM includes two data tap transistors, a data tap current source and a data tap inverter. For example, data tap B0 includes two data tap transistors Q10B, Q20B, a data tap current source IB0 and a data tap inverter D1B. A gate of the first data tap transistor Q10B is coupled to an output of the data tap inverter D1B. An input of the data tap inverter D1B is coupled to a gate of the second data tap transistor Q20B and the output of SR latch 706. The sources of the data tap transistors Q10B, Q20B are coupled to the data tap current source IB0. Respective drains of the data tap transistors Q10B, Q20B are coupled to respective drains of data transistors Q1B, Q2B.

A value of a data tap current provided by each data tap current source corresponds to a tap weight and may be related to channel characteristics. Each data tap is configured to add a corresponding data tap current to, or subtract the corresponding data tap current from, the data differential amplifier 703B output. Whether the corresponding data tap current is added or subtracted is related to the contents of respective latches 706, 708-1, . . . , 708-N, i.e., is related to the decision value stored by each respective latch. Thus, for R1B=R2B=R, Eq_data is equal to R*(I1B−I2B) where I1B includes contributions from latches storing logic zeros and I2B includes contributions from latches storing logic ones. Whether I1B or I2B includes a contribution from data current Idata is related to Data_in 710. If Data_in 710 is positive, then Idata may be included in I1B and if Data_in 710 is negative, then Idata may be included in I2B. The differential output of data summation node circuitry 702B may then correspond to the equalized data, Eq_data 716.

The reference tap currents, e.g., reference tap current IA0, and the data tap currents, e.g., data tap current IB0, correspond to tap weights and are related to channel characteristics, as described herein. Each tap weight corresponds to a respective post-cursor, i.e., a previously received symbol. It may be appreciated that, a sign, i.e., polarity, of a selected tap weight is related to whether the corresponding tap current is a data tap current or a reference tap current. In other words, adding a reference tap current to an equalized reference is equivalent to subtracting a corresponding data tap current from equalized data. Thus, a selected feedback loop from an output of SR latch 706 or a respective one of latches 708-1, . . . , 708-N, may be closed onto reference summation node circuitry 702A or data summation node circuitry 702B with a same magnitude of selected tap weight but an opposite polarity.

In operation, slicer 704 is configured to compare a slicer data input to a slicer reference input and to output a first voltage to the S (set) input of SR latch 706 and a second voltage to the R (reset) input of the SR latch 706, in response to the clock signal CLK. Initially, slicer 704 may be in a reset state and may be configured to output a supply voltage, Vcc, to both the S input and the R input of SR latch 706. SR latch 706 may be configured to not change state in response to a clock signal when both the S input and the R input are receiving the supply voltage, Vcc. In this manner, SR latch 706 may serve as a "memory" element for DFE 700.

If the slicer data input is greater than the slicer reference input, then slicer 704 may be configured to output the supply voltage, Vcc, onto the S input of the SR latch 706 and a reference voltage, e.g., zero volts, on to the R input of the SR latch 706. Conversely, if the slicer data input is less than the slicer reference input, then slicer 704 may be configured to output the reference voltage on to the S input of the SR latch 706 and the supply voltage, Vcc, on to the R input of the SR latch 706. In response to the clock signal, the SR latch 706 may then be configured to store a decision. Thus, if the S input of SR latch 706 is coupled to the supply voltage and the R input is coupled to the reference voltage, then the decision and corresponding output, Data out, may be a logic one and if the S input of SR latch 706 is coupled to the reference voltage and the R input is coupled to the supply voltage, then the decision and corresponding output, Data out, may be a logic zero.

In the embodiments that include reference summation node circuitry 702A, the slicer reference input corresponds to the equalized reference, Eq_ref 718. In the embodiments that include data summation node circuitry 702B, the slicer input corresponds to the equalized data, Eq_data 716. In the embodiments that do not include reference summation node circuitry 702A, the slicer reference input corresponds to Ref_in 712. In the embodiments that do not include data summation node circuitry 702B, the slicer data input corresponds to Data_in 710.

Thus, DFE circuitry 700 may be configured to receive a reference input, Ref_in 712, and a data input, Data_in 710 and to equalize the data input and/or the reference input. DFE circuitry 700 may be further configured to compare the equalized data input to the reference input, to compare the data input to the equalized reference input or to compare the equalized data input to the equalized reference input, (i.e., to make a decision) and to output the result of the comparison, i.e., Data out. Closing at least a portion of the feedback loops on to reference summation node circuitry 702A is configured to reduce a load on the data input and to, thus, facilitate high speed operation of DFE circuitry 700.

Figure 8:
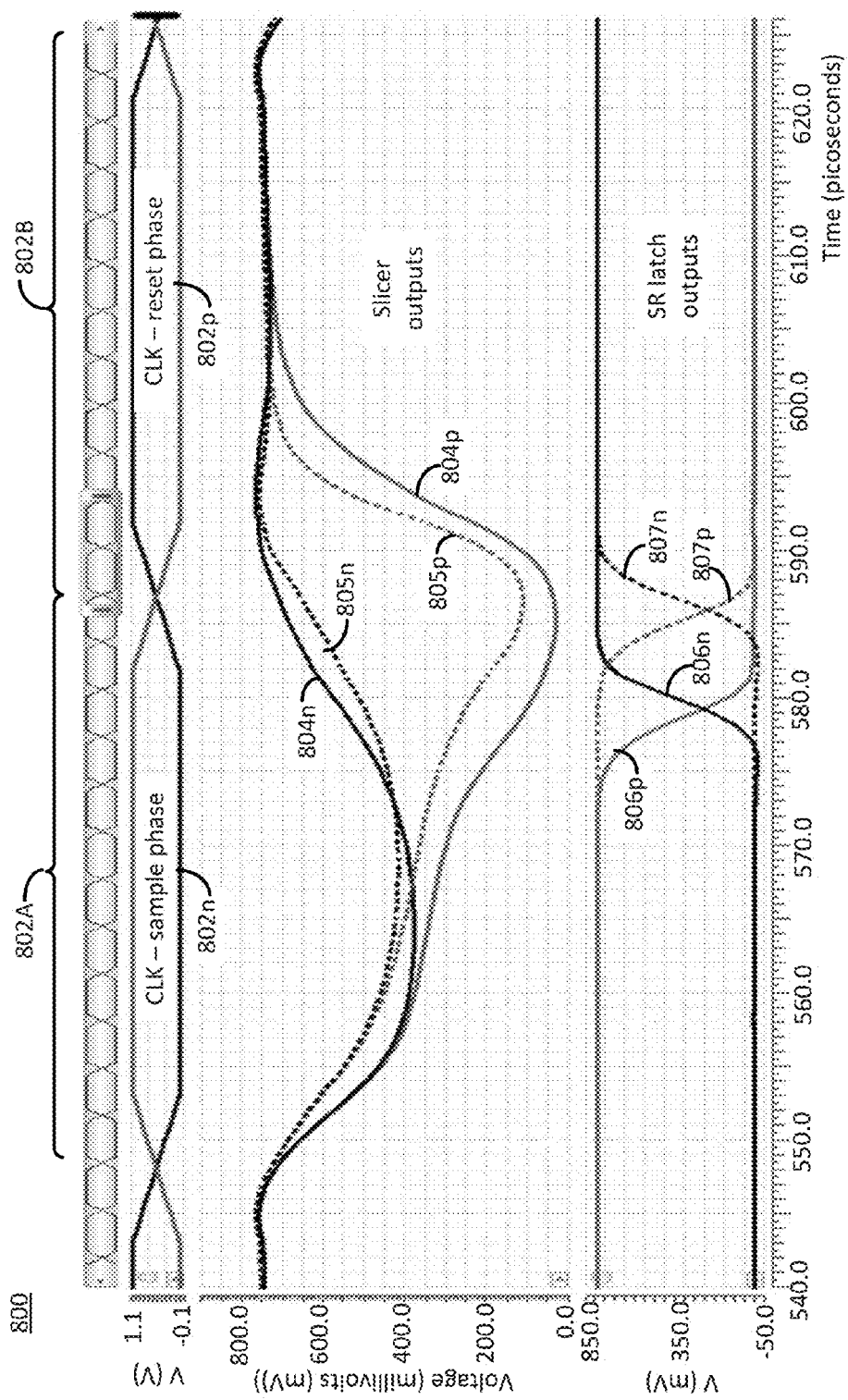
FIG. 8 is a plot illustrating a comparison of slicer and SR latch outputs for example slicers, with and without current path circuitry.

FIG. 8 is a plot 800 illustrating a comparison of slicer and SR latch outputs for example slicers, with and without current path circuitry. The horizontal axis is time in picoseconds and the vertical axis is voltage. Waveforms 802n and 802p correspond to a differential clock signal (e.g., CLK) in volts and include a sample phase 803A and a reset phase 803B. Waveforms 804n and 804p correspond to enhanced slicer differential outputs for, e.g., enhanced slicer 400 of FIG. 4A, and waveforms 805n and 805p correspond to slicer differential outputs for a strong arm slicer, as described herein. The slicer outputs are in millivolts. Waveforms 806n and 806p correspond to SR latch differential outputs for enhanced slicer outputs 804n and 804p and waveforms 807n and 807p correspond to SR latch differential outputs for slicer outputs 805n and 805p. The SR latch outputs are in millivolts.

Thus, an enhanced slicer and/or decision feedback equalization (DFE) circuitry have been described herein. The DFE circuitry includes a slicer that may or may not be enhanced. An enhanced slicer corresponds to a clocked comparator coupled to current path circuitry. The current path circuitry is configured to enhance current flow between at least one output node of the clocked comparator and a reference node (i.e., a supply voltage or ground) of the clocked comparator, in response to a clock signal.

In some embodiments, the DFE circuitry may be configured to close at least some of a number of decision feedback loops onto a reference input signal (i.e., at a reference summation node) rather than onto a data input signal (i.e., at a data summation node). In one example, all of the decision feedback loops may be coupled to the reference summation node. In another example, some of the decision feedback loops may be coupled to the reference summation node and some of the decision feedback loops may be coupled to the data summation node.

Closing the feedback loop on the reference summation node is configured to reduce a load (e.g., parasitic capacitance) on the data input and to, thus, facilitate high-speed operation of the DFE circuitry. Gain penalties associated with closing the feedback loop on the data summation node may be avoided. Closing the feedback loop on the reference summation node may facilitate equalizing each eye of a multilevel modulation technique, e.g., four level pulse amplitude modulation PAM4. In other words, each voltage reference may be equalized separately, thus equalizing each eye independently. Thus, amplitude-dependent channel characteristics and/or receiver gain stages that are not linear may be accommodated.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip.

Network controller 108A, 108B, PHY circuitry 110A, 110B, Tx 112A, 112B, Rx 114A, 114B, communications link 104, transmitter circuitry 132, channel 134 and/or receiver circuitry 136 may be capable of communicating using a selected network communications protocol. One example communications protocol may include an Ethernet communications protocol. The Ethernet protocol may comply or be compatible with an Ethernet standard published by the Institute of Electrical and Electronics Engineers (IEEE), for example, the IEEE standard Std 802.3™-2015, titled "IEEE Standard for Ethernet", published September 2015 and/or earlier (e.g., IEEE Std 802.3™-2012) and/or later and/or related versions of this standard, e.g., an after-developed communication protocol and/or emerging PHY technology specification such as IEEE 802.3bs™ "Standard for Ethernet Amendment: Media Access Control Parameters, Physical Layers and Management Parameters for 200 Gb/s and 400 Gb/s Operation" and/or IEEE 802.3cd™ related to 50 Gb/s Ethernet over a Single Lane and Next Generation 100 Gb/s and 200 Gb/s.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog-Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, means for performing acts of the method, a device, or of an apparatus or system related to a slicer and/or decision feedback equalization circuitry, as discussed below.

Example 1

According to this example, there is provided an enhanced slicer. The enhanced slicer includes a first clocked comparator circuitry and a current path circuitry. The first clocked comparator circuitry includes a first comparator circuitry, a first latch circuitry, a first output node (Out_P) and a second output node (Out_N). The current path circuitry is coupled to the output nodes and a reference node. The current path circuitry is to enhance current flow between at least one of the output nodes and the reference node, in response to a clock signal.

Example 2

This example includes the elements of example 1, wherein the current path circuitry includes a parallel latch circuitry coupled to the output nodes and the reference node.

Example 3

This example includes the elements of example 1, wherein the current path circuitry includes a parallel latch circuitry and a current path regulation circuitry, the parallel latch circuitry coupled to the output nodes and the current path regulation circuitry to regulate the enhanced current flow.

Example 4

This example includes the elements of example 3, wherein the current path regulation circuitry is selected from the group including voltage controlled current path regulation circuitry, digitally controlled current path regulation circuitry or time-based current path regulation circuitry.

Example 5

This example includes the elements according to any one of examples 1 through 3, wherein the current path circuitry includes transistors selected from the group including N-type metal oxide semiconductor field effect transistors (MOSFETs), P-type MOSFETs, npn bipolar junction transistors (BJTs), pnp BJTs, heterojunction BJTs, junction field effect transistors (JFETs), finFETs, insulated gate FETs (IGFETs).

Example 6

This example includes the elements according to any one of examples 1 through 3, wherein the current path circuitry includes N-type metal oxide semiconductor field effect transistors (MOSFETs) or P-type MOSFETs.

Example 7

This example includes the elements according to any one of examples 1 through 3, wherein the first clocked comparator circuitry is selected from the group including N-type clocked comparator circuitry, N-type low kickback clocked comparator circuitry and P-type clocked comparator circuitry.

Example 8

This example includes the elements according to any one of examples 1 through 3, further including a second clocked comparator circuitry coupled to Out_P and Out_N, the first clocked comparator circuitry corresponding to a first stage and the second clocked comparator circuitry corresponding to a second stage.

Example 9

According to this example, there is provided a decision feedback equalizer (DFE). The DFE includes a summation node circuitry; an enhanced slicer circuitry; a set/reset (SR) circuitry; and at least one DFE latch circuitry. The enhanced slicer circuitry includes a first clocked comparator circuitry and a current path circuitry. The first clocked comparator circuitry includes a first comparator circuitry, a first latch circuitry, a first output node (Out_P) and a second output node (Out_N). The current path circuitry is coupled to the output nodes and a reference node. The current path circuitry is to enhance current flow between at least one of the output nodes and the reference node, in response to a clock signal.

Example 10

This example includes the elements of example 9, wherein the current path circuitry includes a parallel latch circuitry coupled to the output nodes and the reference node.

Example 11

This example includes the elements of example 9, wherein the current path circuitry includes a parallel latch circuitry and a current path regulation circuitry, the parallel latch circuitry coupled to the output nodes and the current path regulation circuitry to regulate the enhanced current flow.

Example 12

This example includes the elements of example 9, wherein the summation node circuitry includes a reference summation node circuitry to sum a reference input signal and one or more weighted prior decisions.

Example 13

This example includes the elements of example 11, wherein the current path regulation circuitry is selected from the group including voltage controlled current path regulation circuitry, digitally controlled current path regulation circuitry or time-based current path regulation circuitry.

Example 14

This example includes the elements according to any one of examples 9 through 12, wherein the summation node circuitry includes data summation node circuitry.

Example 15

This example includes the elements according to any one of examples 9 through 12, wherein the current path circuitry includes transistors selected from the group including N-type metal oxide semiconductor field effect transistors (MOSFETs), P-type MOSFETs, npn bipolar junction transistors (BJTs), pnp BJTs, heterojunction BJTs, junction field effect transistors (JFETs), finFETs, insulated gate FETs (IGFETs).

Example 16

This example includes the elements according to any one of examples 9 through 12, wherein the current path circuitry includes N-type metal oxide semiconductor field effect transistors (MOSFETs) or P-type MOSFETs.

Example 17

This example includes the elements according to any one of examples 9 through 12, wherein the first clocked comparator circuitry is selected from the group including N-type clocked comparator circuitry, N-type low kickback clocked comparator circuitry and P-type clocked comparator circuitry.

Example 18

This example includes the elements according to any one of examples 9 through 12, wherein the enhanced slicer further includes a second clocked comparator circuitry coupled to Out_P and Out_N, the first clocked comparator circuitry corresponding to a first stage and the second clocked comparator circuitry corresponding to a second stage.

Example 19

This example includes the elements according to any one of examples 9 through 12, wherein the summation node circuitry corresponds to current summation node circuitry.

Example 20

According to this example, there is provided a receiver. The receiver includes a gain stage circuitry; a clock and data recovery circuitry; a reference source circuitry; and a decision feedback equalizer (DFE) circuitry. The DFE circuitry includes a summation node circuitry; an enhanced slicer circuitry; a set/reset (SR) circuitry; and at least one DFE latch circuitry. The enhanced slicer circuitry includes a first clocked comparator circuitry and a current path circuitry. The first clocked comparator circuitry includes a first comparator circuitry, a first latch circuitry, a first output node (Out_P) and a second output node (Out_N). The current path circuitry is coupled to the output nodes and a reference node. The current path circuitry is to enhance current flow between at least one of the output nodes and the reference node, in response to a clock signal.

Example 21

This example includes the elements of example 20, wherein the current path circuitry includes a parallel latch circuitry coupled to the output nodes and the reference node.

Example 22

This example includes the elements of example 20, wherein the current path circuitry includes a parallel latch circuitry and a current path regulation circuitry, the parallel latch circuitry coupled to the output nodes and the current path regulation circuitry to regulate the enhanced current flow.

Example 23

This example includes the elements of example 20, wherein the summation node circuitry includes a reference summation node circuitry to sum a reference input signal and one or more weighted prior decisions.

Example 24

This example includes the elements of example 22, wherein the current path regulation circuitry is selected from the group including voltage controlled current path regulation circuitry, digitally controlled current path regulation circuitry or time-based current path regulation circuitry.

Example 25

This example includes the elements according to any one of examples 20 through 23, wherein the summation node circuitry includes data summation node circuitry.

Example 26

This example includes the elements according to any one of examples 20 through 23, wherein the current path circuitry includes transistors selected from the group including N-type metal oxide semiconductor field effect transistors (MOSFETs), P-type MOSFETs, npn bipolar junction transistors (BJTs), pnp BJTs, heterojunction BJTs, junction field effect transistors (JFETs), finFETs, insulated gate FETs (IGFETs).

Example 27

This example includes the elements according to any one of examples 20 through 23, wherein the current path circuitry includes N-type metal oxide semiconductor field effect transistors (MOSFETs) or P-type MOSFETs.

Example 28

This example includes the elements according to any one of examples 20 through 23, wherein the first clocked comparator circuitry is selected from the group including N-type clocked comparator circuitry, N-type low kickback clocked comparator circuitry and P-type clocked comparator circuitry.

Example 29

This example includes the elements according to any one of examples 20 through 23, wherein the enhanced slicer further includes a second clocked comparator circuitry coupled to Out_P and Out_N, the first clocked comparator circuitry corresponding to a first stage and the second clocked comparator circuitry corresponding to a second stage.

Example 30

This example includes the elements according to any one of examples 20 through 23, wherein the summation node circuitry corresponds to current summation node circuitry.

Example 31

This example includes the elements according to any one of examples 20 through 23, wherein the receiver further includes front end equalizer circuitry.

Example 32

According to this example, there is provided a method. The method includes comparing, by a first clocked comparator circuitry, a slicer data input and a slicer reference input. The first clocked comparator circuitry includes a first comparator circuitry, a first latch circuitry, a first output node (Out_P) and a second output node (Out_N). The method further includes enhancing, by a current path circuitry, a current flow between at least one of the output nodes and the reference node. The current path circuitry is coupled to the output nodes and the reference node. The enhancing is in response to a clock signal.

Example 33

This example includes the elements of example 32, wherein the current path circuitry includes a parallel latch circuitry coupled to the output nodes and the reference node.

Example 34

This example includes the elements of example 32, further including regulating, by a current path regulation circuitry, the enhanced current flow.

Example 35

This example includes the elements of example 32, further including summing by a summation node circuitry, an input signal and at least one weighted prior decision and outputting, by the summation node circuitry, at least one of the slicer data input and/or the slicer reference input.

Example 36

This example includes the elements of example 34, wherein the current path regulation circuitry is selected from the group including voltage controlled current path regulation circuitry, digitally controlled current path regulation circuitry or time-based current path regulation circuitry.

Example 37

This example includes the elements of example 35, wherein the summation node circuitry includes at least one of a reference summation node circuitry and/or a data summation node circuitry.

Example 38

This example includes the elements of example 32, wherein the current path circuitry includes transistors selected from the group including N-type metal oxide semiconductor field effect transistors (MOSFETs), P-type MOSFETs, npn bipolar junction transistors (BJTs), pnp BJTs, heterojunction BJTs, junction field effect transistors (JFETs), finFETs, insulated gate FETs (IGFETs).

Example 39

This example includes the elements of example 32, wherein the current path circuitry includes N-type metal oxide semiconductor field effect transistors (MOSFETs) or P-type MOSFETs.

Example 40

This example includes the elements of example 32, wherein the first clocked comparator circuitry is selected from the group including N-type clocked comparator circuitry, N-type low kickback clocked comparator circuitry and P-type clocked comparator circuitry.

Example 41

This example includes the elements of example 32, wherein the enhanced slicer further includes a second clocked comparator circuitry coupled to Out_P and Out_N, the first clocked comparator circuitry corresponding to a first stage and the second clocked comparator circuitry corresponding to a second stage.

Example 42

This example includes the elements of example 32, wherein the summation node circuitry corresponds to current summation node circuitry.

Example 43

This example includes the elements of example 32, further including recovering, by a clock and data recovery circuitry, the clock signal from received serial data.

Example 44

According to this example, there is provided a decision feedback equalizer (DFE). The DFE includes a summation node circuitry; a slicer circuitry; a set/reset (SR) circuitry; and at least one DFE latch circuitry. The summation node circuitry includes a reference summation node circuitry to sum a reference input signal and one or more weighted prior decisions.

Example 45

This example includes the elements of example 44, wherein the summation node circuitry further includes a data summation node circuitry.

Example 46

This example includes the elements of example 44, wherein the summation node circuitry corresponds to current summation node circuitry.

Example 47

This example includes the elements according to any one of examples 44 to 46, wherein the slicer circuitry includes a first clocked comparator circuitry, the first clocked comparator circuitry including a first comparator circuitry, a first latch circuitry, a first output node (Out_P) and a second output node (Out_N); and a current path circuitry coupled to the output nodes and a reference node, the current path circuitry to enhance current flow between at least one of the output nodes and the reference node, in response to a clock signal.

Example 48

This example includes the elements of example 47, wherein the current path circuitry includes a parallel latch circuitry coupled to the output nodes and the reference node.

Example 49

This example includes the elements of example 47, wherein the current path circuitry includes a parallel latch circuitry and a current path regulation circuitry, the parallel latch circuitry coupled to the output nodes and the current path regulation circuitry to regulate the enhanced current flow.

Example 50

This example includes the elements of example 49, wherein the current path regulation circuitry is selected from the group including voltage controlled current path regulation circuitry, digitally controlled current path regulation circuitry or time-based current path regulation circuitry.

Example 51

This example includes the elements of example 47, wherein the current path circuitry includes transistors selected from the group including N-type metal oxide semiconductor field effect transistors (MOSFETs), P-type MOSFETs, npn bipolar junction transistors (BJTs), pnp BJTs, heterojunction BJTs, junction field effect transistors (JFETs), finFETs, insulated gate FETs (IGFETs).

Example 52

This example includes the elements of example 47, wherein the current path circuitry includes N-type metal oxide semiconductor field effect transistors (MOSFETs) or P-type MOSFETs.

Example 53

This example includes the elements of example 47, wherein the first clocked comparator circuitry is selected from the group including N-type clocked comparator circuitry, N-type low kickback clocked comparator circuitry and P-type clocked comparator circuitry.

Example 54

This example includes the elements of example 47, wherein the slicer circuitry further includes a second clocked comparator circuitry coupled to Out_P and Out_N, the first clocked comparator circuitry corresponding to a first stage and the second clocked comparator circuitry corresponding to a second stage.

Example 55

According to this example, there is provided a receiver. The receiver includes a gain stage circuitry; a clock and data recovery circuitry; a reference source circuitry; and a decision feedback equalizer (DFE) circuitry. The DFE circuitry includes a summation node circuitry; a slicer circuitry; a set/reset (SR) circuitry; and at least one DFE latch circuitry. The summation node circuitry includes a reference summation node circuitry to sum a reference input signal and one or more weighted prior decisions.

Example 56

This example includes the elements of example 55, wherein the summation node circuitry further includes a data summation node circuitry.

Example 57

This example includes the elements of example 55, wherein the summation node circuitry corresponds to current summation node circuitry.

Example 58

This example includes the elements according to any one of examples 55 to 57, wherein the slicer circuitry includes a first clocked comparator circuitry, the first clocked comparator circuitry including a first comparator circuitry, a first latch circuitry, a first output node (Out_P) and a second output node (Out_N); and a current path circuitry coupled to the output nodes and a reference node, the current path circuitry to enhance current flow between at least one of the output nodes and the reference node, in response to a clock signal.

Example 59

This example includes the elements of example 58, wherein the current path circuitry includes a parallel latch circuitry coupled to the output nodes and the reference node.

Example 60

This example includes the elements of example 58, wherein the current path circuitry includes a parallel latch circuitry and a current path regulation circuitry, the parallel latch circuitry coupled to the output nodes and the current path regulation circuitry to regulate the enhanced current flow.

Example 61

This example includes the elements of example 60, wherein the current path regulation circuitry is selected from the group including voltage controlled current path regulation circuitry, digitally controlled current path regulation circuitry or time-based current path regulation circuitry.

Example 62

This example includes the elements of example 58, wherein the current path circuitry includes transistors selected from the group including N-type metal oxide semiconductor field effect transistors (MOSFETs), P-type MOSFETs, npn bipolar junction transistors (BJTs), pnp BJTs, heterojunction BJTs, junction field effect transistors (JFETs), finFETs, insulated gate FETs (IGFETs).

Example 63

This example includes the elements of example 58, wherein the current path circuitry includes N-type metal oxide semiconductor field effect transistors (MOSFETs) or P-type MOSFETs.

Example 64

This example includes the elements of example 58, wherein the first clocked comparator circuitry is selected from the group including N-type clocked comparator circuitry, N-type low kickback clocked comparator circuitry and P-type clocked comparator circuitry.

Example 65

This example includes the elements of example 58, wherein the slicer circuitry further includes a second clocked comparator circuitry coupled to Out_P and Out_N, the first clocked comparator circuitry corresponding to a first stage and the second clocked comparator circuitry corresponding to a second stage.

Example 66

This example includes the elements according to any one of examples 55 to 57, wherein the receiver further includes front end equalizer circuitry.

Example 67

According to this example, there is provided a system. The system includes at least one device arranged to perform the method of any one of examples 32 to 43.

Example 68

According to this example, there is provided a device. The device includes means to perform the method of any one of examples 32 to 43.

Example 69

According to this example, there is provided an Ethernet physical layer (PHY). The Ethernet PHY includes a transmitter; and a receiver. The receiver includes a gain stage circuitry; a clock and data recovery circuitry; a reference source circuitry; and a decision feedback equalizer (DFE) circuitry. The DFE circuitry includes a summation node circuitry; an enhanced slicer circuitry; a set/reset (SR) circuitry; and at least one DFE latch circuitry. The enhanced slicer circuitry includes a first clocked comparator circuitry and a current path circuitry. The first clocked comparator circuitry includes a first comparator circuitry, a first latch circuitry, a first output node (Out_P) and a second output node (Out_N). The current path circuitry is coupled to the output nodes and a reference node, the current path circuitry to enhance current flow between at least one of the output nodes and the reference node, in response to a clock signal.

Example 70

This example includes the elements of example 69, wherein the current path circuitry includes a parallel latch circuitry coupled to the output nodes and the reference node.

Example 71

This example includes the elements of example 69, wherein the current path circuitry includes a parallel latch circuitry and a current path regulation circuitry, the parallel latch circuitry coupled to the output nodes and the current path regulation circuitry to regulate the enhanced current flow.

Example 72

This example includes the elements of example 69, wherein the summation node circuitry includes a reference summation node circuitry to sum a reference input signal and one or more weighted prior decisions.

Example 73

This example includes the elements of example 71, wherein the current path regulation circuitry is selected from the group including voltage controlled current path regulation circuitry, digitally controlled current path regulation circuitry or time-based current path regulation circuitry.

Example 74

This example includes the elements according to any one of examples 69 through 72, wherein the summation node circuitry includes data summation node circuitry.

Example 75

This example includes the elements according to any one of examples 69 through 72, wherein the current path circuitry includes transistors selected from the group including N-type metal oxide semiconductor field effect transistors (MOSFETs), P-type MOSFETs, npn bipolar junction transistors (BJTs), pnp BJTs, heterojunction BJTs, junction field effect transistors (JFETs), finFETs, insulated gate FETs (IGFETs).

Example 76

This example includes the elements according to any one of examples 69 through 72, wherein the current path circuitry includes N-type metal oxide semiconductor field effect transistors (MOSFETs) or P-type MOSFETs.

Example 77

This example includes the elements according to any one of examples 69 through 72, wherein the first clocked comparator circuitry is selected from the group including N-type clocked comparator circuitry, N-type low kickback clocked comparator circuitry and P-type clocked comparator circuitry.

Example 78

This example includes the elements according to any one of examples 69 through 72, wherein the enhanced slicer further includes a second clocked comparator circuitry coupled to Out_P and Out_N, the first clocked comparator circuitry corresponding to a first stage and the second clocked comparator circuitry corresponding to a second stage.

Example 79

This example includes the elements according to any one of examples 69 through 72, wherein the summation node circuitry corresponds to current summation node circuitry.

Example 80

This example includes the elements according to any one of examples 69 through 72, wherein the receiver further includes front end equalizer circuitry.

Example 81

According to this example, there is provided an Ethernet physical layer (PHY). The Ethernet PHY includes a transmitter; and a receiver. The receiver includes a gain stage circuitry; a clock and data recovery circuitry; a reference source circuitry; and a decision feedback equalizer (DFE) circuitry. The DFE circuitry includes a summation node circuitry, a slicer circuitry, a set/reset (SR) circuitry, and at least one DFE latch circuitry. The summation node circuitry includes a reference summation node circuitry to sum a reference input signal and one or more weighted prior decisions.

Example 82

This example includes the elements of example 81, wherein the summation node circuitry further includes a data summation node circuitry.

Example 83

This example includes the elements of example 81, wherein the summation node circuitry corresponds to current summation node circuitry.

Example 84

This example includes the elements according to any one of examples 81 to 83, wherein the slicer circuitry includes a first clocked comparator circuitry, the first clocked comparator circuitry including a first comparator circuitry, a first latch circuitry, a first output node (Out_P) and a second output node (Out_N); and a current path circuitry coupled to the output nodes and a reference node, the current path circuitry to enhance current flow between at least one of the output nodes and the reference node, in response to a clock signal.

Example 85

This example includes the elements of example 84, wherein the current path circuitry includes a parallel latch circuitry coupled to the output nodes and the reference node.

Example 86

This example includes the elements of example 84, wherein the current path circuitry includes a parallel latch circuitry and a current path regulation circuitry, the parallel latch circuitry coupled to the output nodes and the current path regulation circuitry to regulate the enhanced current flow.

Example 87

This example includes the elements of example 86, wherein the current path regulation circuitry is selected from the group including voltage controlled current path regulation circuitry, digitally controlled current path regulation circuitry or time-based current path regulation circuitry.

Example 88

This example includes the elements of example 84, wherein the current path circuitry includes transistors selected from the group including N-type metal oxide semiconductor field effect transistors (MOSFETs), P-type MOSFETs, npn bipolar junction transistors (BJTs), pnp BJTs, heterojunction BJTs, junction field effect transistors (JFETs), finFETs, insulated gate FETs (IGFETs).

Example 89

This example includes the elements of example 84, wherein the current path circuitry includes N-type metal oxide semiconductor field effect transistors (MOSFETs) or P-type MOSFETs.

Example 90

This example includes the elements of example 84, wherein the first clocked comparator circuitry is selected from the group including N-type clocked comparator circuitry, N-type low kickback clocked comparator circuitry and P-type clocked comparator circuitry.

Example 91

This example includes the elements of example 84, wherein the slicer circuitry further includes a second clocked comparator circuitry coupled to Out_P and Out_N, the first clocked comparator circuitry corresponding to a first stage and the second clocked comparator circuitry corresponding to a second stage.

Example 92

This example includes the elements according to any one of examples 81 to 83, wherein the receiver further includes front end equalizer circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An enhanced slicer comprising:
   a first clocked comparator circuitry comprising a first comparator circuitry, a first latch circuitry, a first output node (Out_P) and a second output node (Out_N); and
   a current path circuitry coupled to the output nodes and a reference node, the current path circuitry to enhance current flow between at least one of the output nodes and the reference node, in response to a clock signal.

2. The enhanced slicer of claim 1, wherein the current path circuitry comprises a parallel latch circuitry coupled to the output nodes and the reference node.

3. The enhanced slicer of claim 1, wherein the current path circuitry comprises a parallel latch circuitry and a current path regulation circuitry, the parallel latch circuitry coupled to the output nodes and the current path regulation circuitry to regulate the enhanced current flow.

4. The enhanced slicer of claim 3, wherein the current path regulation circuitry is selected from the group comprising voltage controlled current path regulation circuitry, digitally controlled current path regulation circuitry or time-based current path regulation circuitry.

5. The enhanced slicer of claim 1, wherein the current path circuitry comprises transistors selected from the group comprising N-type metal oxide semiconductor field effect transistors (MOSFETs), P-type MOSFETs, npn bipolar junction transistors (BJTs), pnp BJTs, heterojunction BJTs, junction field effect transistors (JFETs), finFETs, insulated gate FETs (IGFETs).

6. The enhanced slicer of claim 1, further comprising a second clocked comparator circuitry coupled to Out_P and Out_N, the first clocked comparator circuitry corresponding to a first stage and the second clocked comparator circuitry corresponding to a second stage.

7. A decision feedback equalizer (DFE) comprising:
   a summation node circuitry;
   an enhanced slicer circuitry;
   a set/reset (SR) circuitry; and
   at least one DFE latch circuitry,
   the enhanced slicer circuitry comprising:
      a first clocked comparator circuitry comprising a first comparator circuitry, a first latch circuitry, a first output node (Out_P) and a second output node (Out_N); and
      a current path circuitry coupled to the output nodes and a reference node, the current path circuitry to enhance current flow between at least one of the output nodes and the reference node, in response to a clock signal.

8. The decision feedback equalizer of claim 7, wherein the current path circuitry comprises a parallel latch circuitry coupled to the output nodes and the reference node.

9. The decision feedback equalizer of claim 7, wherein the current path circuitry comprises a parallel latch circuitry and a current path regulation circuitry, the parallel latch circuitry coupled to the output nodes and the current path regulation circuitry to regulate the enhanced current flow.

10. The decision feedback equalizer of claim 7, wherein the summation node circuitry comprises a reference summation node circuitry to sum a reference input signal and one or more weighted prior decisions.

11. The decision feedback equalizer of claim 7, wherein the summation node circuitry comprises data summation node circuitry.

12. The decision feedback equalizer of claim 9, wherein the current path regulation circuitry is selected from the group comprising voltage controlled current path regulation circuitry, digitally controlled current path regulation circuitry or time-based current path regulation circuitry.

13. The decision feedback equalizer of claim 7, wherein the current path circuitry comprises transistors selected from the group comprising N-type metal oxide semiconductor field effect transistors (MOSFETs), P-type MOSFETs, npn bipolar junction transistors (BJTs), pnp BJTs, heterojunction BJTs, junction field effect transistors (JFETs), finFETs, insulated gate FETs (IGFETs).

14. The decision feedback equalizer of claim 7, wherein the enhanced slicer further comprises a second clocked comparator circuitry coupled to Out_P and Out_N, the first clocked comparator circuitry corresponding to a first stage and the second clocked comparator circuitry corresponding to a second stage.

15. The decision feedback equalizer of claim 7, wherein the summation node circuitry corresponds to current summation node circuitry.

16. An Ethernet physical layer (PHY) comprising:
a transmitter; and
a receiver, the receiver comprising
a gain stage circuitry; a clock and data recovery circuitry; a reference source circuitry; and a decision feedback equalizer (DFE) circuitry,
the DFE circuitry comprising:
a summation node circuitry;
an enhanced slicer circuitry;
a set/reset (SR) circuitry; and
at least one DFE latch circuitry,
the enhanced slicer circuitry comprising:
a first clocked comparator circuitry comprising a first comparator circuitry, a first latch circuitry, a first output node (Out_P) and a second output node (Out_N); and
a current path circuitry coupled to the output nodes and a reference node, the current path circuitry to enhance current flow between at least one of the output nodes and the reference node, in response to a clock signal.

17. The Ethernet PHY of claim 16, wherein the current path circuitry comprises a parallel latch circuitry coupled to the output nodes and the reference node.

18. The Ethernet PHY of claim 16, wherein the current path circuitry comprises a parallel latch circuitry and a current path regulation circuitry, the parallel latch circuitry coupled to the output nodes and the current path regulation circuitry to regulate the enhanced current flow.

19. The Ethernet PHY of claim 16, wherein the summation node circuitry comprises a reference summation node circuitry to sum a reference input signal and one or more weighted prior decisions.

20. The Ethernet PHY of claim 16, wherein the summation node circuitry comprises data summation node circuitry.

21. The Ethernet PHY of claim 18, wherein the current path regulation circuitry is selected from the group comprising voltage controlled current path regulation circuitry, digitally controlled current path regulation circuitry or time-based current path regulation circuitry.

22. The Ethernet PHY of claim 16, wherein the current path circuitry comprises transistors selected from the group comprising N-type metal oxide semiconductor field effect transistors (MOSFETs), P-type MOSFETs, npn bipolar junction transistors (BJTs), pnp BJTs, heterojunction BJTs, junction field effect transistors (JFETs), finFETs, insulated gate FETs (IGFETs).

23. The Ethernet PHY of claim 16, wherein the enhanced slicer further comprises a second clocked comparator circuitry coupled to Out_P and Out_N, the first clocked comparator circuitry corresponding to a first stage and the second clocked comparator circuitry corresponding to a second stage.

24. The Ethernet PHY of claim 16, wherein the summation node circuitry corresponds to current summation node circuitry.

25. The Ethernet PHY of claim 16, wherein the receiver further comprises front end equalizer circuitry.

* * * * *